United States Patent [19]
Nordine

[11] 3,926,391
[45] Dec. 16, 1975

[54] FAIL-SAFE BALLISTIC PARACHUTE SPREADER APPARATUS

[75] Inventor: Louis R. Nordine, Aurora, Colo.

[73] Assignee: Stanley Aviation Corporation, Denver, Colo.

[22] Filed: July 7, 1965

[21] Appl. No.: 470,111

[52] U.S. Cl. .............................................. 244/149
[51] Int. Cl. ........................................... B64d 17/72
[58] Field of Search .......... 244/122, 141, 142, 147, 244/149, 148, 150; 89/1 B; 102/49.5

[56] References Cited
UNITED STATES PATENTS

| | | | |
|---|---|---|---|
| 1,081,137 | 12/1913 | VonAugezd | 244/147 |
| 2,499,379 | 3/1950 | Garrett | 89/1 B |
| 2,732,153 | 1/1956 | Frieder et al. | 244/150 |
| 2,953,333 | 9/1960 | Stencel | 244/147 |
| 3,133,408 | 5/1964 | Stoff | 89/1 B |
| 3,281,098 | 10/1966 | Stencel et al. | 244/149 |

Primary Examiner—Trygve M. Blix
Assistant Examiner—Galen L. Barefoot
Attorney, Agent, or Firm—Strauch, Nolan, Neale, Nies & Kurz

[57] ABSTRACT

An apparatus for deploying and opening a parachute comprising a rocket secured to the parachute canopy by a towline. The rocket is adapted to be launched from the parachute pack and ignited to deploy the collapsed canopy in upright position and thus pay out the suspension lines. A spreader mounted in the pack has a series of projectiles which are connected by flexible lines to the canopy skirt and which are ejected from a housing to spread and thus open the deployed canopy.

19 Claims, 58 Drawing Figures

INVENTOR
ROBERT M. STANLEY
and LOUIS R. NORDINE

BY Strauch, Nolan, Neale, Nies and Bronaugh
ATTORNEYS

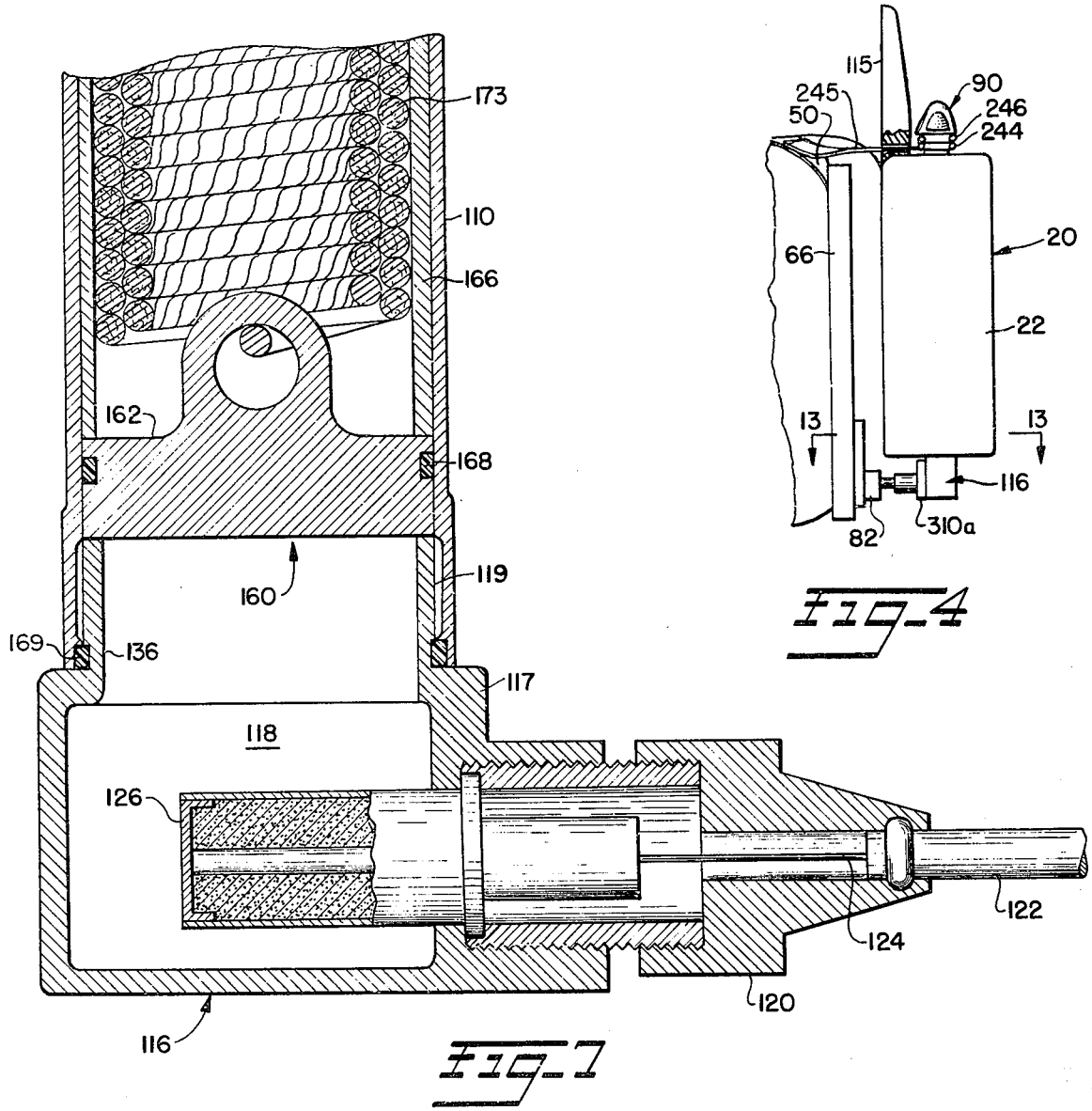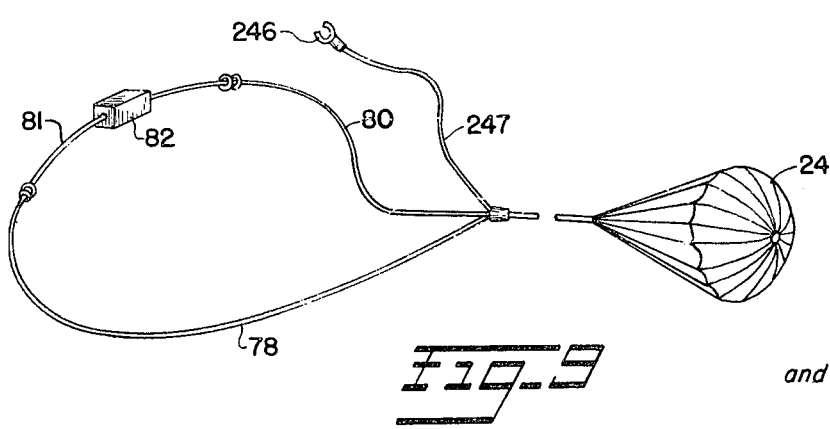

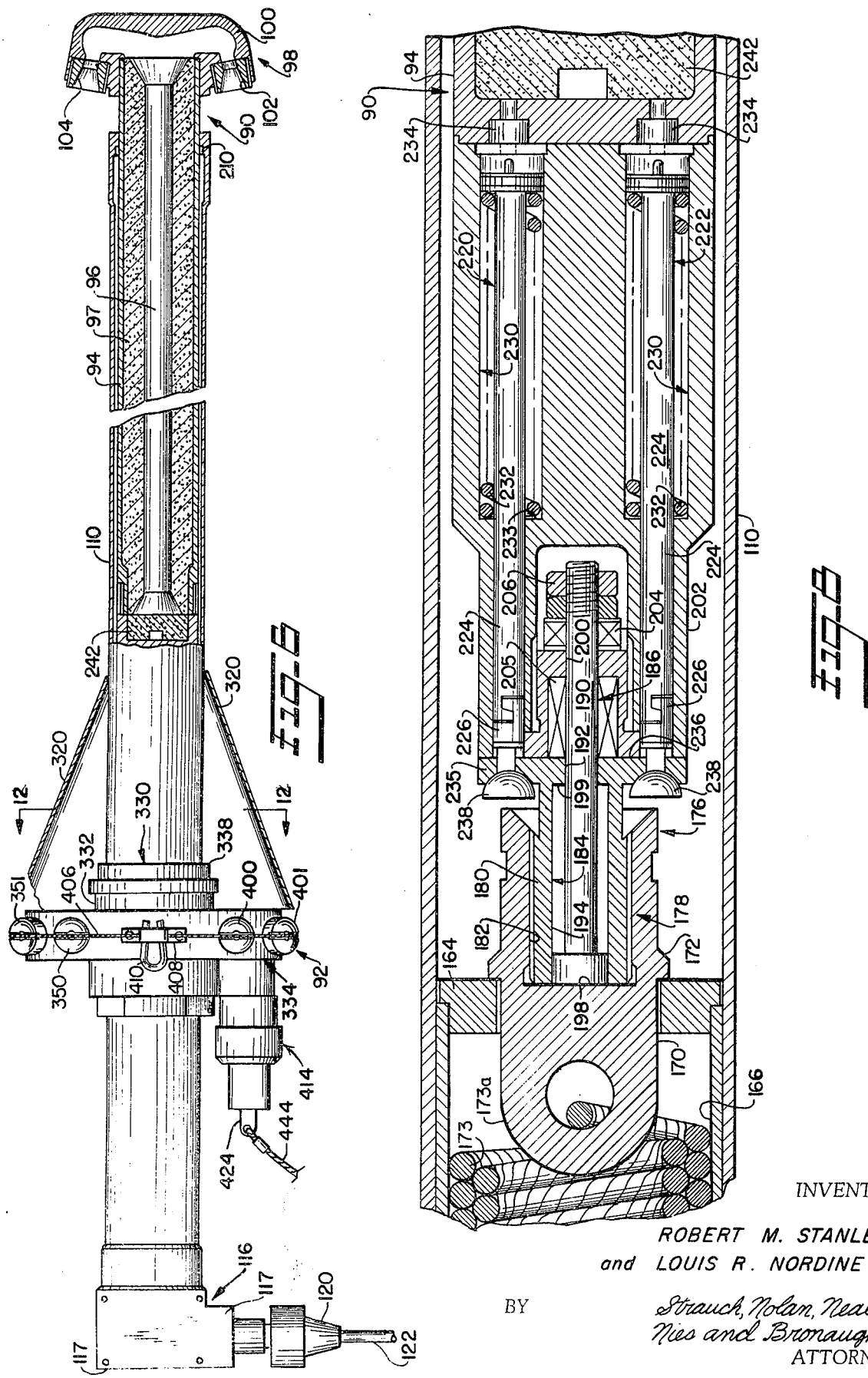

INVENTOR
ROBERT M. STANLEY
and LOUIS R. NORDINE

BY Strauch, Nolan, Neale,
Nies and Bronaugh
ATTORNEYS

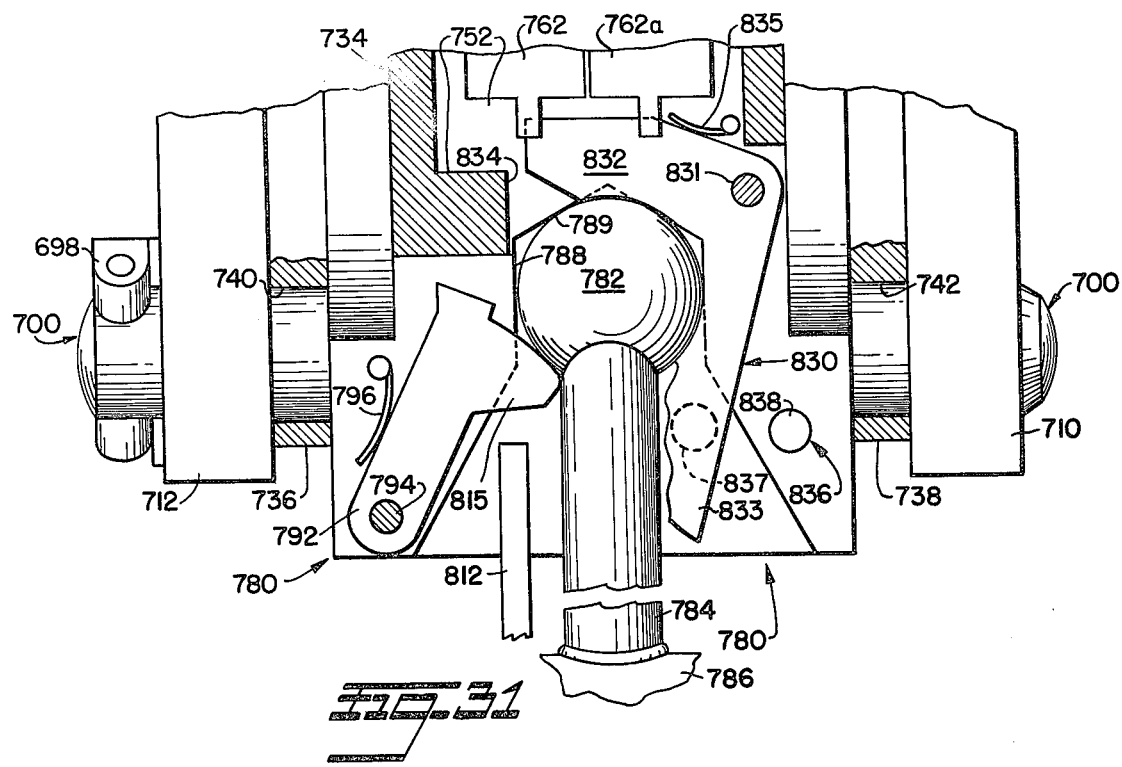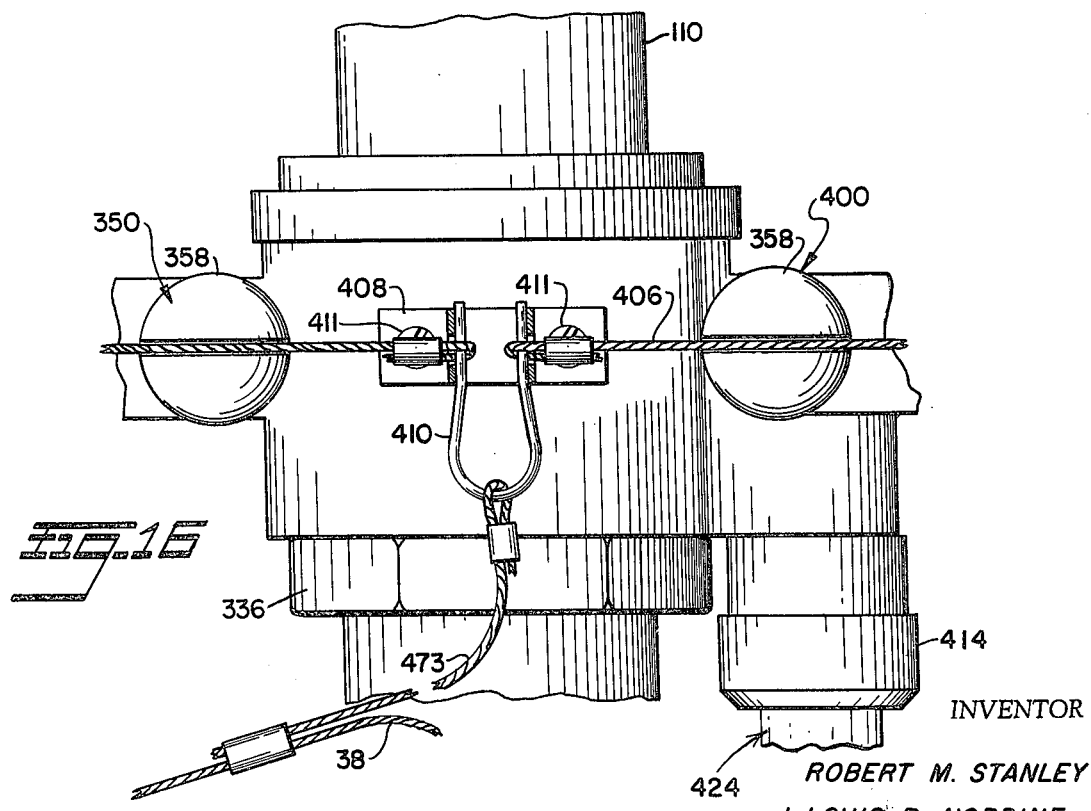

INVENTOR
ROBERT M. STANLEY
and LOUIS R. NORDINE

BY Strauch, Nolan, Neale,
Nies and Bronaugh
ATTORNEYS

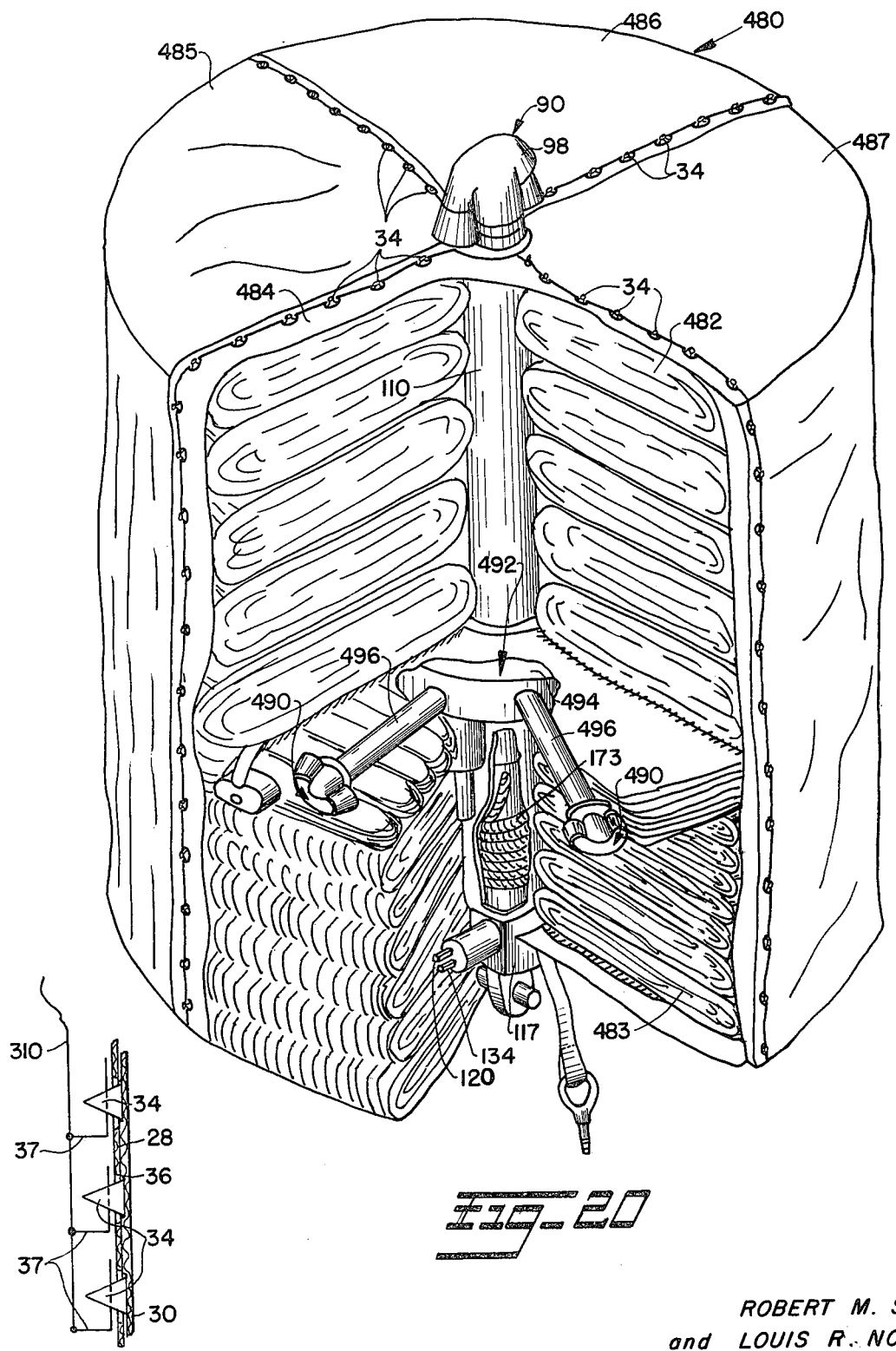

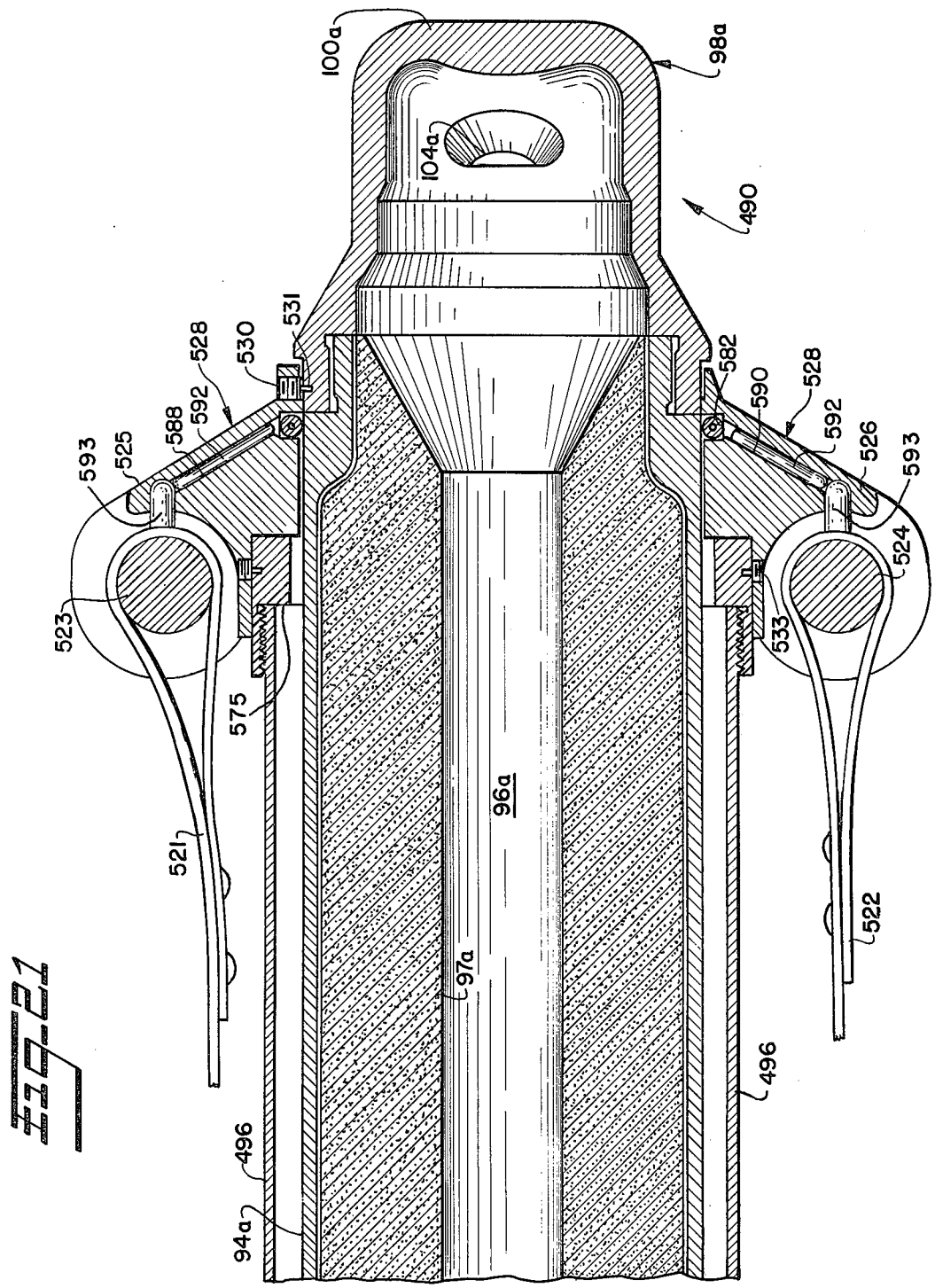

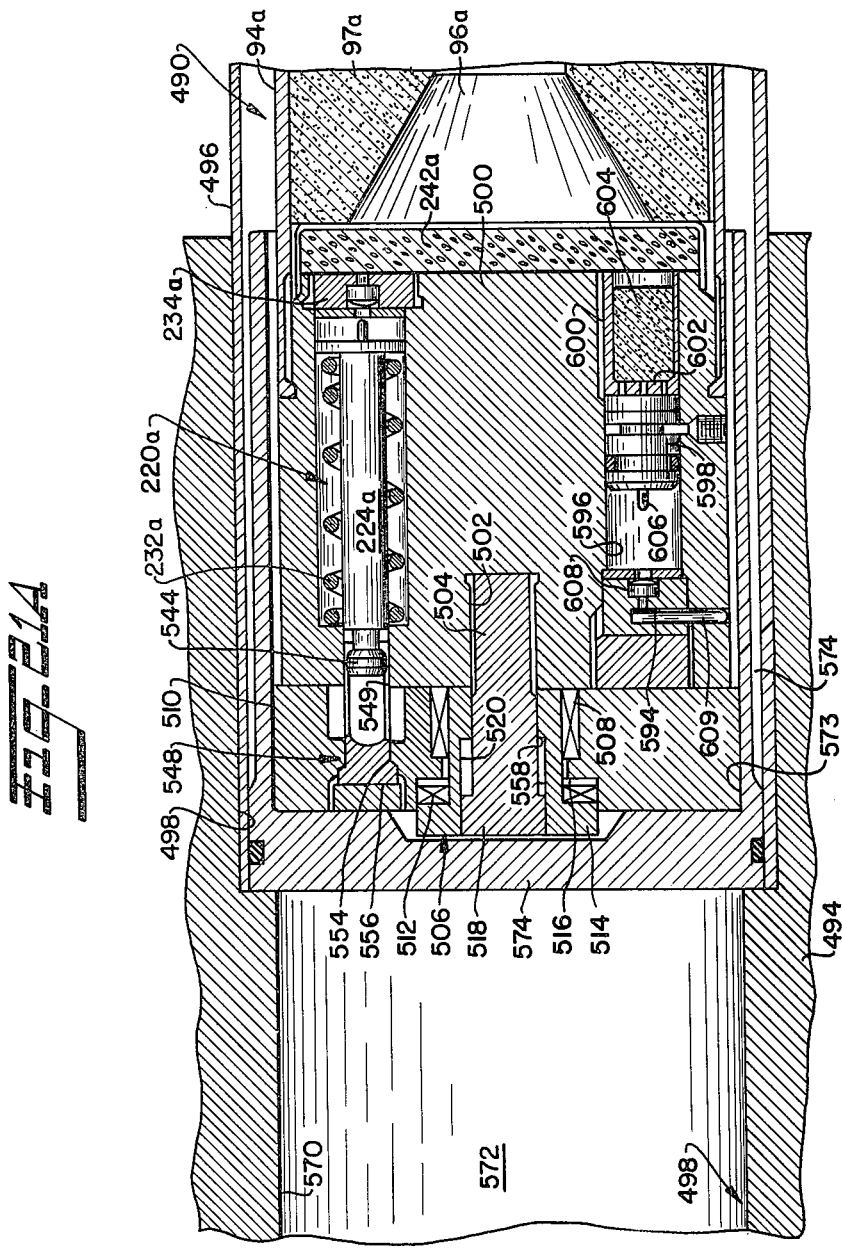

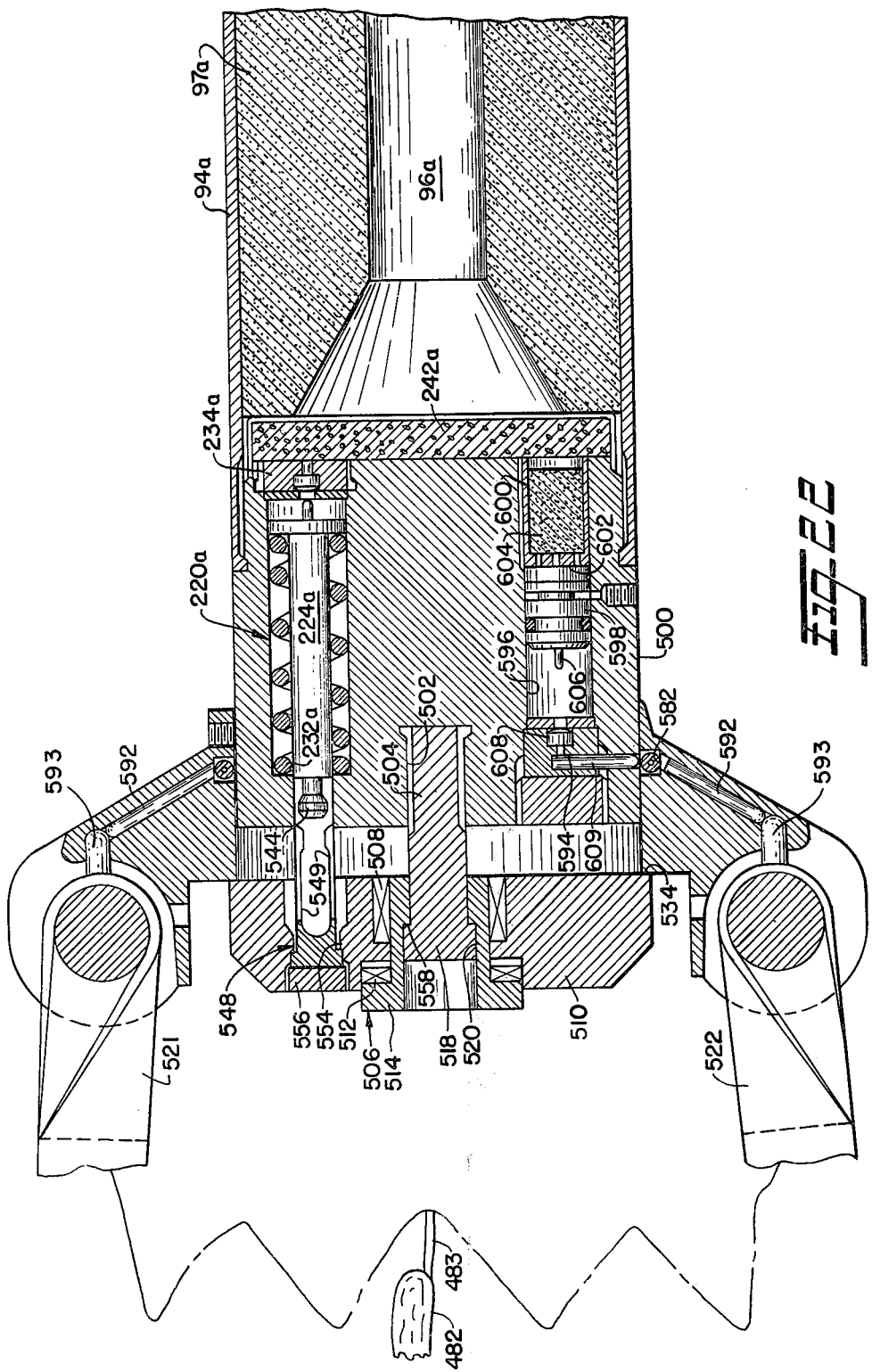

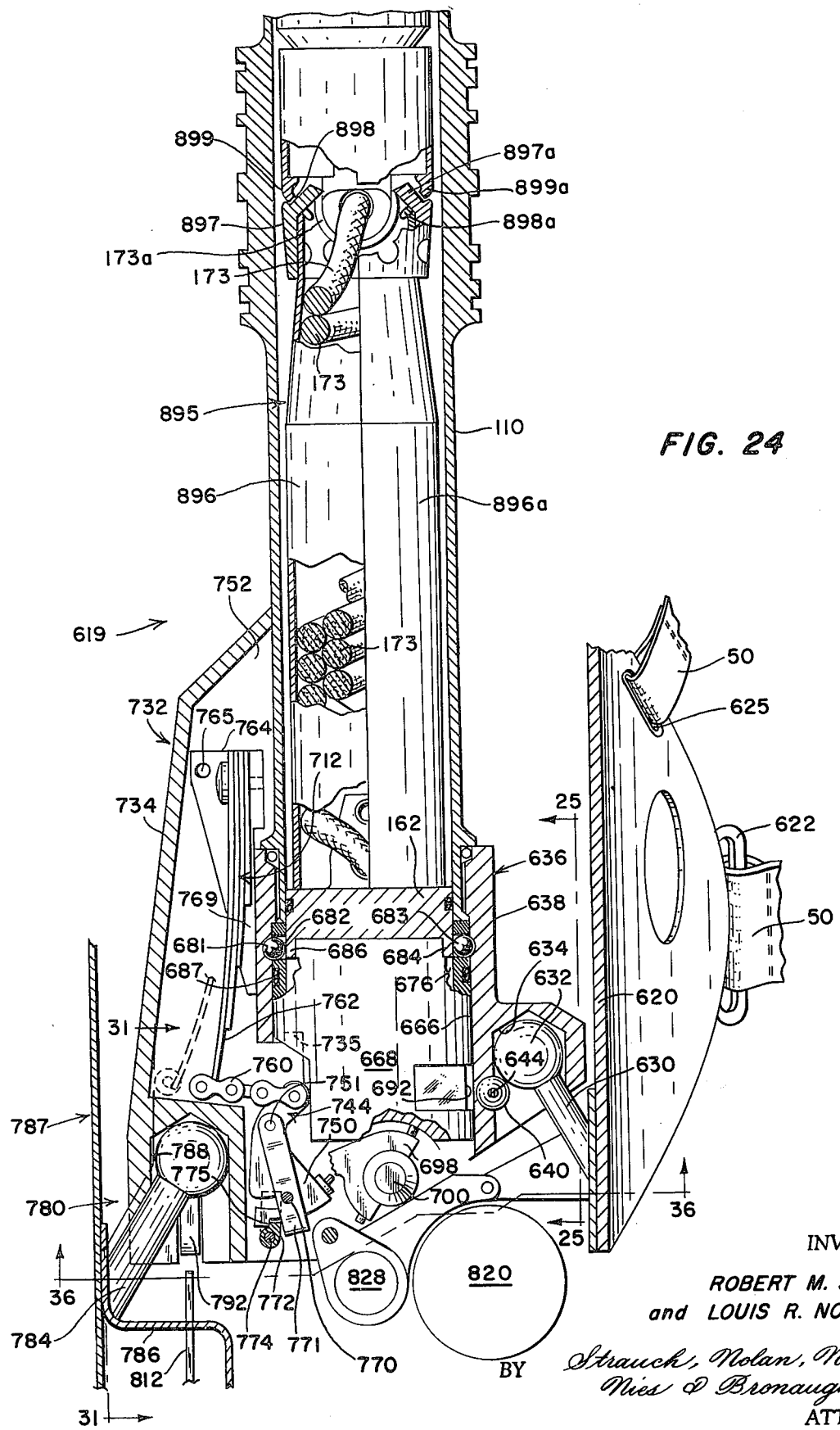

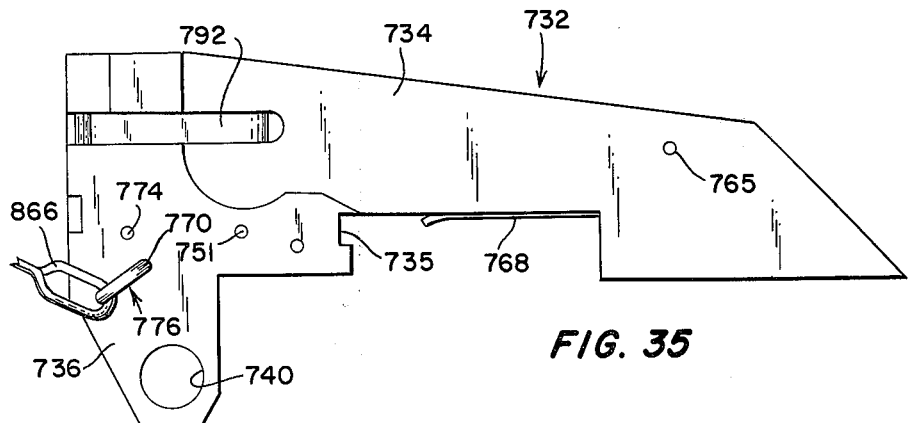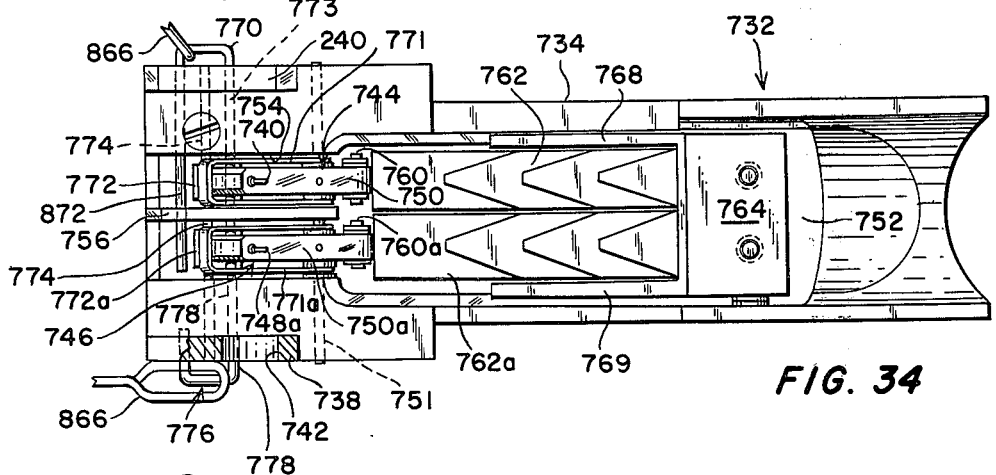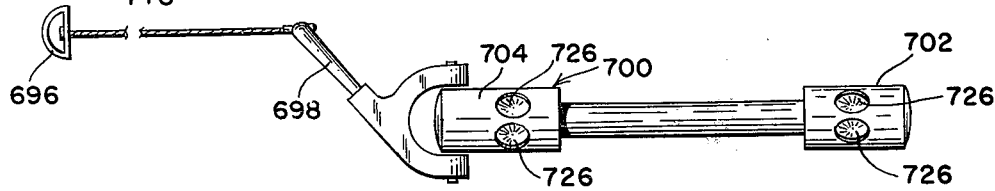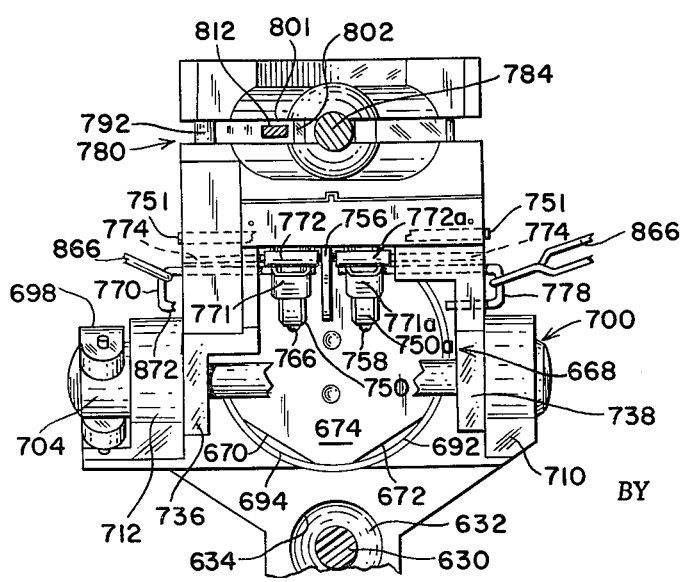

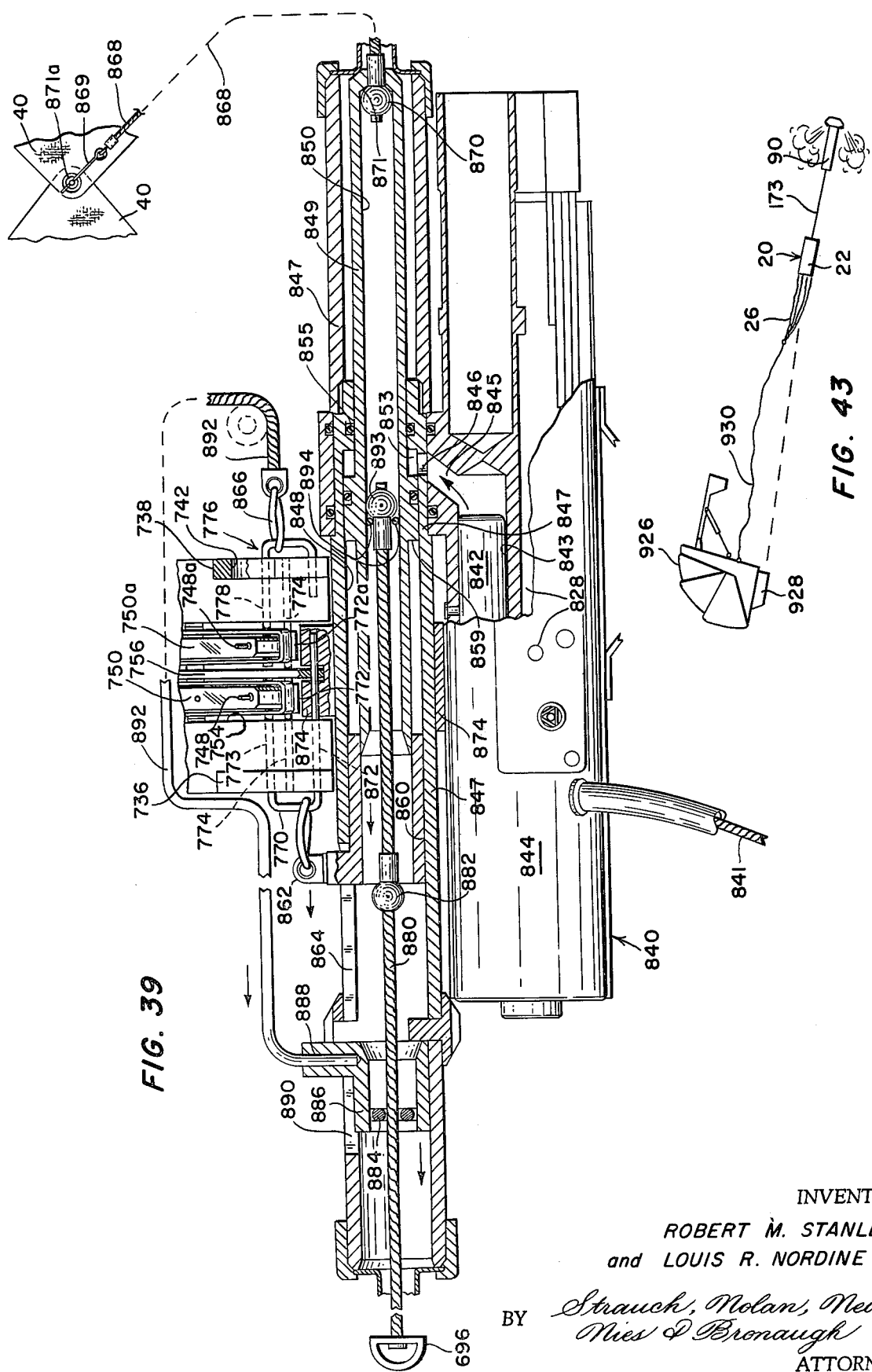

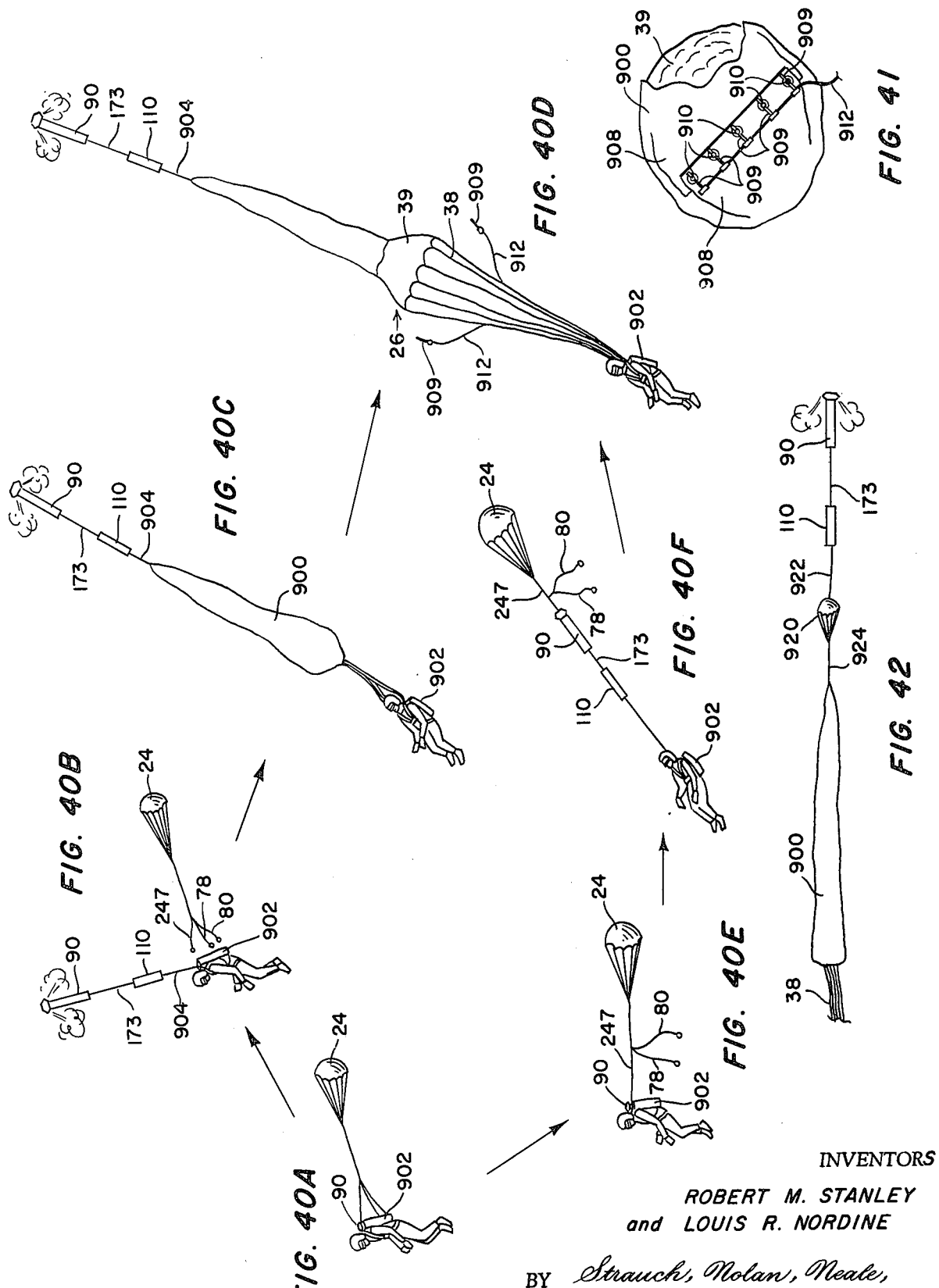

FAIL-SAFE BALLISTIC PARACHUTE SPREADER APPARATUS

The present invention relates to apparatus for forcibly deploying and opening parachutes.

Prior to this invention, ballistic gun devices have been employed to rapidly deploy and open a parachute for effecting the recovery of a person or cargo removed from an aircraft or the like. Conventional ballistic gun devices for deploying parachutes typically comprise a tube, mounting a spreading gun, centrally located in and secured to the packed parachute canopy. The aforementioned tube encloses a central tube mounted on the body to be recovered or on an adjacent body. When pressure, from a cartridge is introduced into the central tube, the outer tube, the spreading gun and the pack containing the canopy are propelled away from the load. Conventional ballistic devices for spreading the parachute canopy after its suspension lines are stretched out by the launcher gun action usually are in the form of gun-type spreader mechanisms having a multiplicity of projectiles which are secured to the skirt of the canopy and which are fired by igniting a cartridge to spread the canopy skirt. Usually, the canopy spreading cartridge is ingited by inertial forces acting upon the spreading mechanism as the parachute pack is decelerated during riser line stretch.

Although the foregoing types of conventional ballistic gun devices are operative to deploy and open a parachute more quickly than is possible with a parachute subject only to aerodynamic forces, they suffer from a number of serious disadvantages and shortcomings which render them unsafe and unreliable, particularly when they must be carried on the person to be recovered. For instance, conventional, inertially actuated canopy spreading mechanisms are subject to malfunction if the parachute pack tumbles while it is deploying. Also, the magnitude of the inertial force that is available for actuating conventional canopy spreading mechanisms is objectionably subject to wide variations caused mainly by differences in attitude relative to the wind vector. In addition, gun barrel friction, marginal projection cartridge performance, and line deployment friction may result in the parachute pack reaching line stretch with insufficient energy to actuate the spreading mechanism with the result that a malfunction will occur. For these reasons and others, ignition of a canopy spreading cartridge by parachute pack inertia is very unreliable and is fundamentally unreliable at low air speeds for the distance of man-pack separation at the time of desired ignition. Conventional inertially actuated canopy spreader systems are also objectionable from the standpoint that they do not incorporate adequate redundancies for assuring safe recovery of a person or cargo.

Another serious disadvantage of ballistic gun devices proposed prior to this invention is that the energy available for spreading the canopy is unsatisfactorily low for low-speed or zero-speed application owing to the inherent limitations of usable kinetic energy stored in a multiplicity of small spreading weights. With conventional spreading mechanisms, premature cartridge ignition would likely result in severe injury to the person being recovered.

In conventional ballistic gun-type canopy spreading mechanisms, the hot explosive gases resulting from firing the cartridge for projecting the canopy spreading weights are not confined and consequently escape possibly to contact and thereby to damage the parachute canopy in the region of its skirt. This is very objectionable since the canopy skirt is the most highly loaded portion of the parachute. In addition, the escape of hot gases as a result of successfully ejecting one of the canopy spreading weights from the spreader head may be so great that insufficient gas pressure remains in the spreader head to eject the remaining weights or to eject them with sufficient force to uniformly spread the parachute canopy.

Another serious shortcoming of conventional ballistic gun-type deployment or spreading mechanisms is that in the event the launching or spreading cartridge do not ignite, the canopy remains positively restrained from deployment inflation by aerodynamic forces. Conventional deployment and spreading devices proposed prior to this invention provide no adequate fail-safe feature whereby the canopy will deploy or inflate by means of aerodynamic forces in the event of ignition failure. A further feature tending to retard opening of a parachute canopy in conventional parachute pack assemblies incorporating ballistic gun devices for deploying and opening the parachute is that in operatively connecting the parachute canopy to the ballistic spreading devices, the canopy usually is packed upside down and inside out so that its skirt rather than its apex is closer to the top of the pack.

In order to achieve even marginally reliable ignition of the canopy spreading charge by the conventional inertial devices previously mentioned, unacceptably high recoil forces must be generated to project the canopy away from a man with the result that the person being recovered is likely to incur severe injury. The recoil force needed for truly reliable actuation of conventional canopy spreaders is believed to be beyond human tolerance.

Another serious shortcoming of conventional ballistically deployed and opened parachute assemblies is that the parachute is not capable of being manually deployed and opened as by pulling a standard "D" ring. In this connection, devices proposed prior to the invention rely entirely upon successful ignition of a launching gun cartridge followed by the spreader cartridge and near simultaneous ejection of canopy spreading weights.

With prior ballistic gun devices, the heavy metal assembly of the canopy spreader head and the tube for launching the parachute pack objectionably remains attached to the parachute and dangles from the inflated canopy to present a potential source of injury to the person being recovered upon landing. Such dangling hardware also constitutes a potential source of entanglement with the parachute. If mounted on the man, the projection gun and supporting structure of conventional ballistic parachute assemblies would constitute a landing hazard for the man.

Accordingly, it is a major object of this invention to overcome the foregoing shortcomings and deficiencies attributable to conventional ballistic gun devices by providing for a novel apparatus for rapidly and reliably deploying and opening a parachute.

A more specific object of this invention is to provide a novel tractor-type rocket assembly for deploying a parachute.

In accordance with this invention, the tractor-type rocket is secured by a flexible tow line to the parachute canopy and is ballistically launched in unignited condition from a stored position in the parachute pack. As the rocket moves away from the parachute on the person or the cargo, the tow line is pulled taut to automatically ignite the rocket. Once ignited, the rocket applies a steady pull through the tow line to deploy the parachute pack away from a man or cargo and pay out the parachute suspension lines through the bottom of the pack. The tow line is of sufficient length that the rocket does not ignite until it is a safe distance from the person or cargo and the parachute pack.

Owing to the relatively small force needed to launch the rocket in the apparatus of this invention, the resulting recoil is considerably less than that encountered with ballistic gun development devices where sufficient explosive force is needed to project the recovery parachute pack itself. With the present invention, the pulling thrust of the rocket deploys the parachute, and the ballistic firing mechanism need only have sufficient capacity for launching the rocket from a launching tube in the parachute pack.

Accordingly, it is a further object of this invention to provide a novel mechanism for igniting the tractor-type rocket called for in the previous object when the tow line is pulled substantially taut.

Another important object of this invention is to provide a novel canopy spreading mechanism for opening the canopy of the parachute by ballistically fired projectiles or by rockets.

With the present invention, the canopy is folded on the top of the spreader with the apex of the canopy adjacent to the top of the pack. When the suspension lines are nearly stretched out as a result of deploying the parachute, the spreading mechanism of this invention is operated in response to suspension line stretch to open the canopy, greatly reducing the delay associated with opening induced by aerodynamic pressures, especially at low velocities. In addition, the construction and arrangement of the tractor rocket, rocket launcher and spreader mechanism with the stored parachute provides, in accordance with this invention, a compact, slim pack which easily and comfortably fits between the wearer and the back of a seat in an aircraft or the like.

Another important object of this invention is to provide a novel canopy spreader device in which the gases produced by igniting the canopy spreading cartridge are confined within the spreader heat even after the spreader weights are ejected from the spreader head for opening the parachute. This feature of the present invention has the following advantages:

1. Premature ejection of one or more of the spreader weights does not permit the gas to leak out of the spreader head to reduce the pressure acting to eject the remaining weights.
2. No hot gases are permitted to escape to contact and thereby damage the parachute or injure the person being recovered.
3. There is an absence of objectionable explosive noise as the canopy is opened ballistically.

In addition, the present invention enables fewer, more massive, weights to be used in comparison with the greater number of smaller weights employed in conventional ballistic gun-type spreader mechanisms. As a result, the spreader mechanism of this invention imparts the needed momentum to open the parachute without excessive velocity and hence, with less local inertia load on the parachute fabric.

Another object of this invention is to provide a novel automatic parachute recovery system which is safe and dependable. In conjunction with this object and according to one embodiment of the present invention, the recovery parachute deploying rocket or other form of projectile is launched from the pack in response to a predetermined condition occurring during the escape sequence, a pilot parachute is automatically deployed and released, and a canopy spreading device is automatically activated to open the deployed recovery parachute, all in proper sequence. Advantageously, ignition of the ballistics for launching the recovery parachute rocket or other form of projectile is, according to a further object of this invention, prevented until the man separates from his seat.

Still a further important object of this invention is to provide a novel backup system that enables a person to manually deploy and open the parachute in the event the automatic ballistic initiated system malfunctions or in the event the person wishes to puposely bypass the automatic initiated system when, for example, he desires to bail out over the side.

Still a further object of this invention is to provide a novel, automatic backup system for deploying and opening and recovery parachute in the event a primary system fails to function.

Still a further object of this invention is to provide a noval parachute deployment and opening apparatus which completely separates from the parachute after its deployment. This feature of the present invention eliminates the hazard of dangling parts from injuring the person being recovered or from becoming entangled with the parachute.

Further objects of this invention will appear as the description proceeds in connection with the appended claims and the annexed drawings wherein:

FIG. 4 is a side elevation of the parachute pack and attachment means illustrated in FIG. 1;

FIG. 5 is a section taken substantially along lines 5—5 of FIG. 1 and illustrating the pack construction for joining together the two halves of the pack covering;

FIG. 6 is a partially sectioned elevation of the tractor rocket and launching tube assembly shown in FIGS. 1 and 2;

FIG. 7 is an enlarged, fragmentary, longitudinal section of the lower end of the launching assembly shown in FIG. 6;

FIG. 8 is an enlarged, fragmentary, longitudinal section of the upper end of the launching assembly and forming a continuation of the section shown in FIG. 7;

FIG. 9 is a perspective view of the stabilizing parachute together with its bridle lines;

Figure 12:
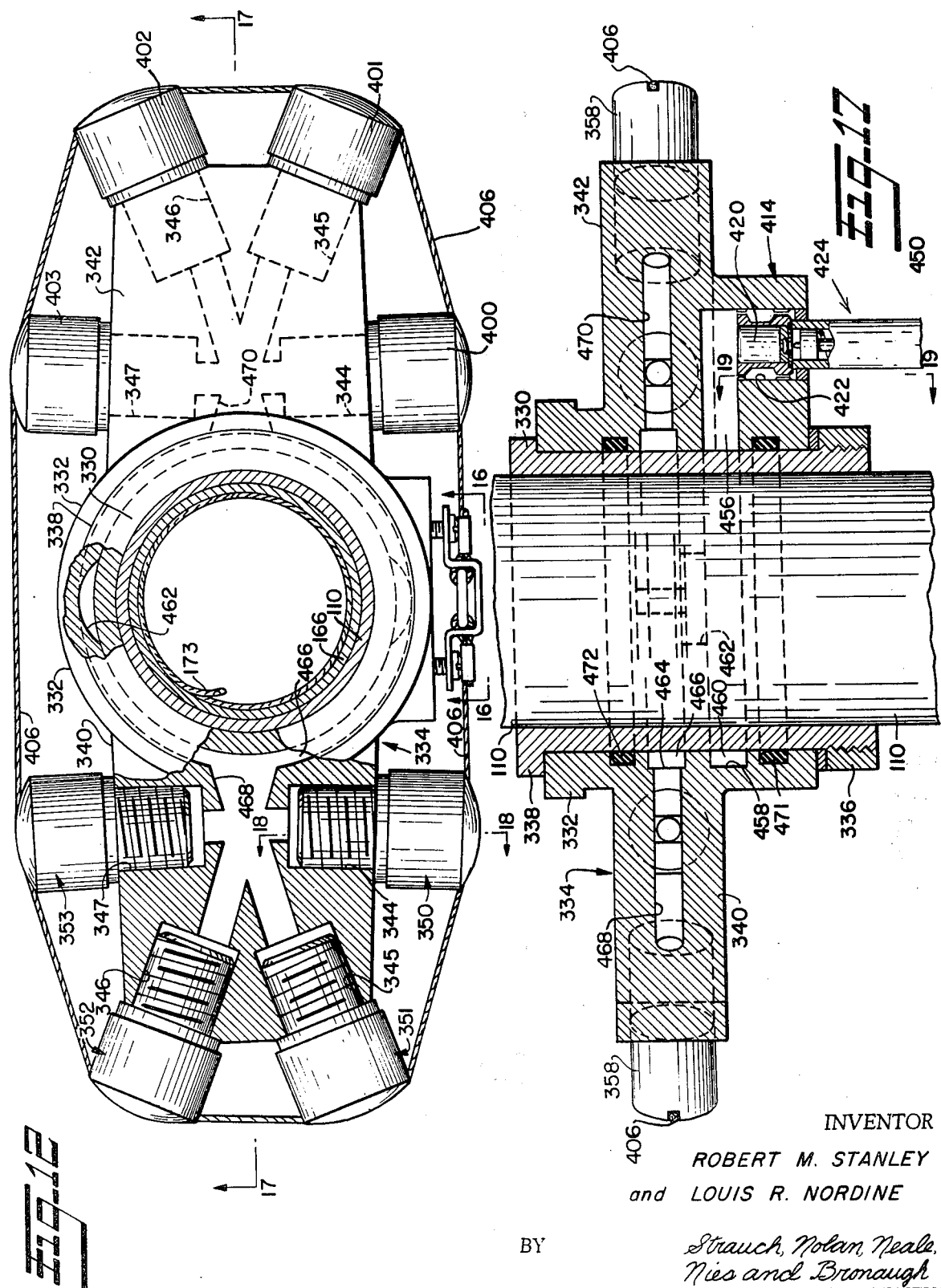
Figure 13:
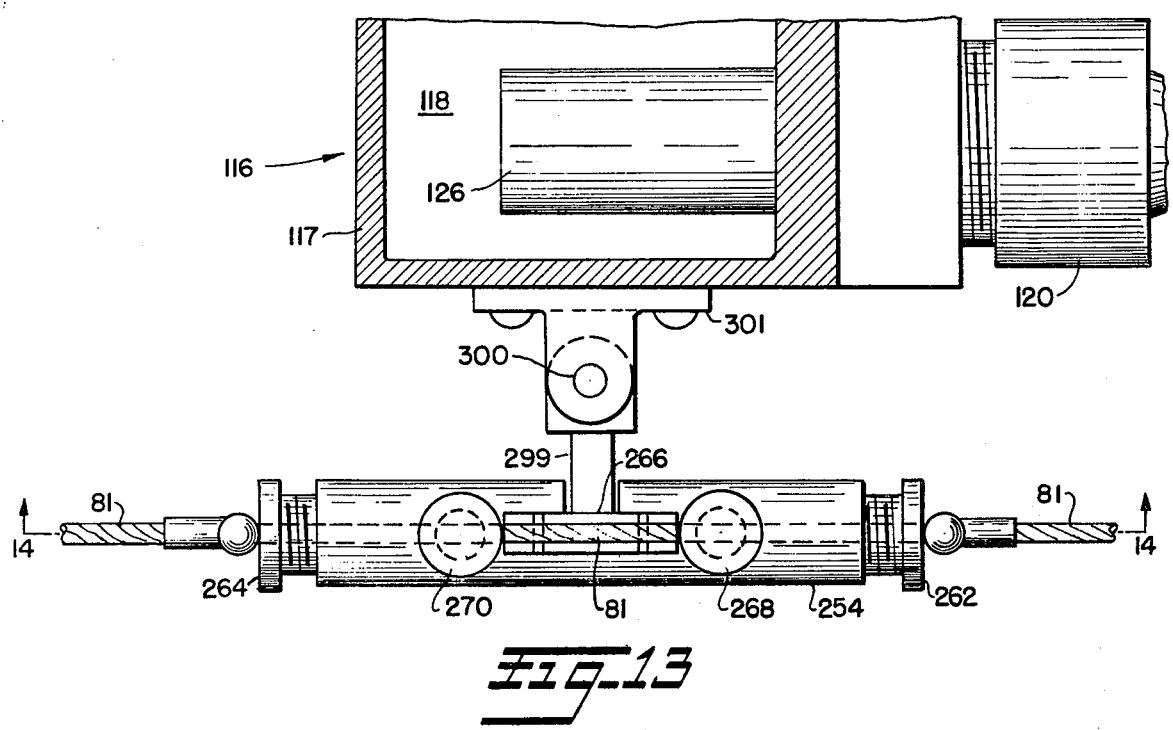
Figure 14:
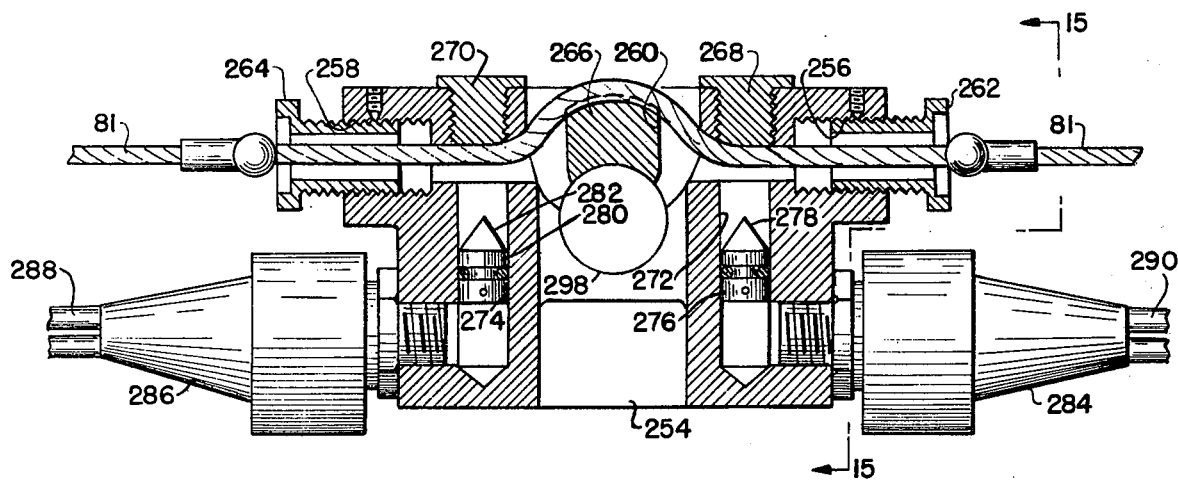
Figure 15:
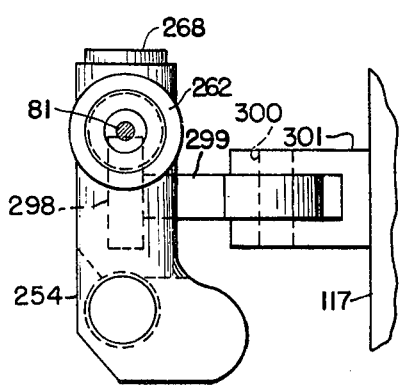
Figure 18:
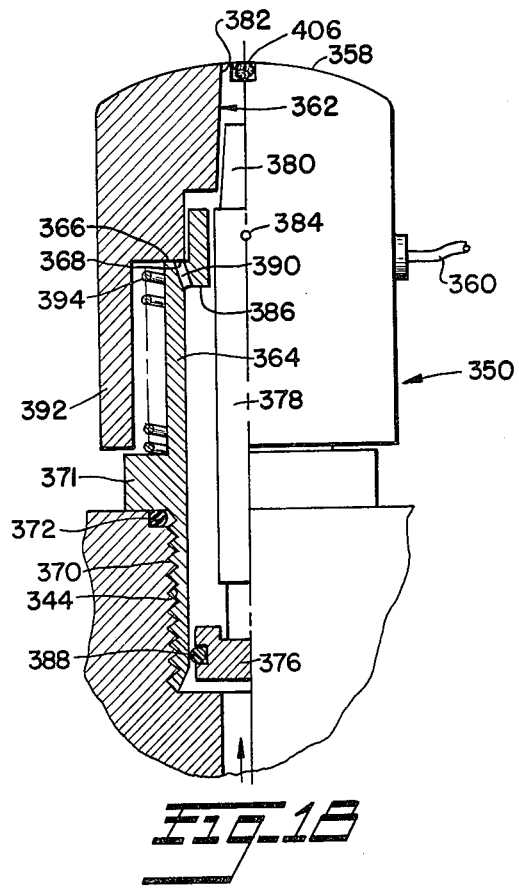
Figure 19:
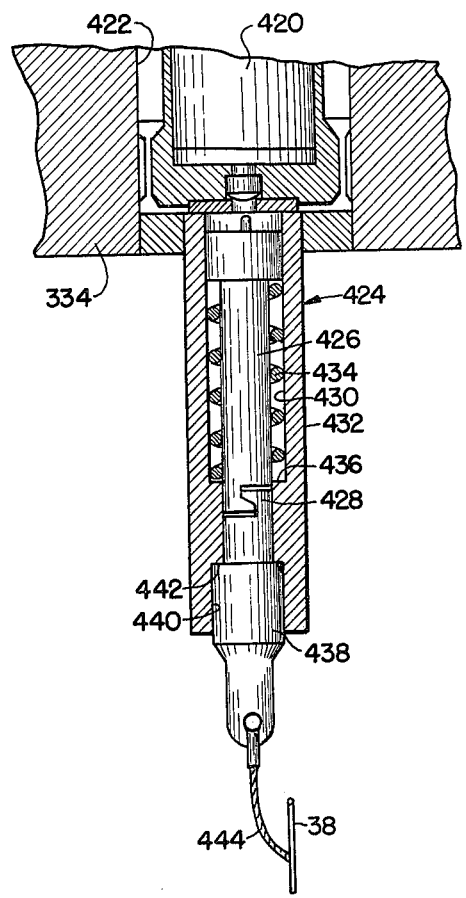
Figure 23:
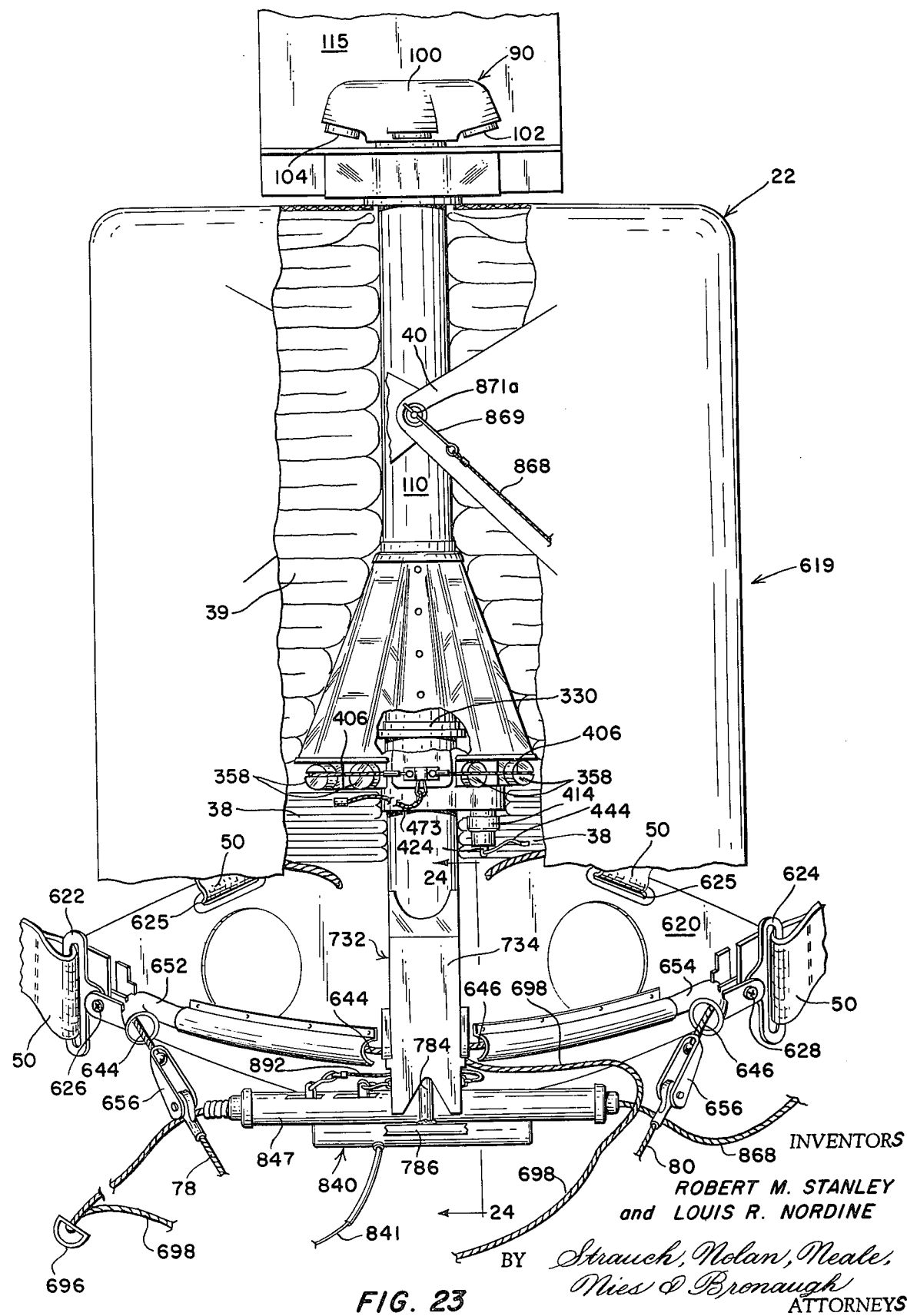
Figure 38:
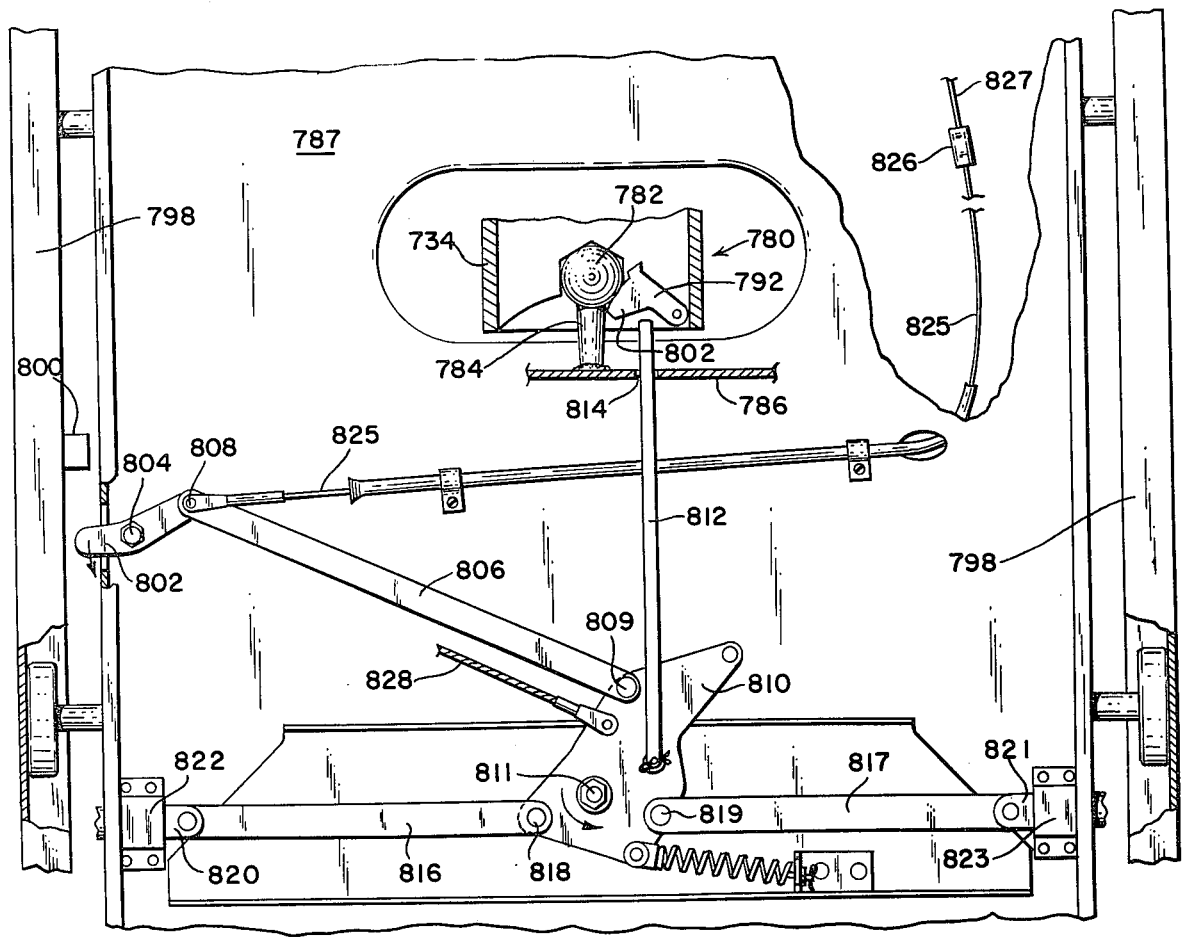
Figure 25:
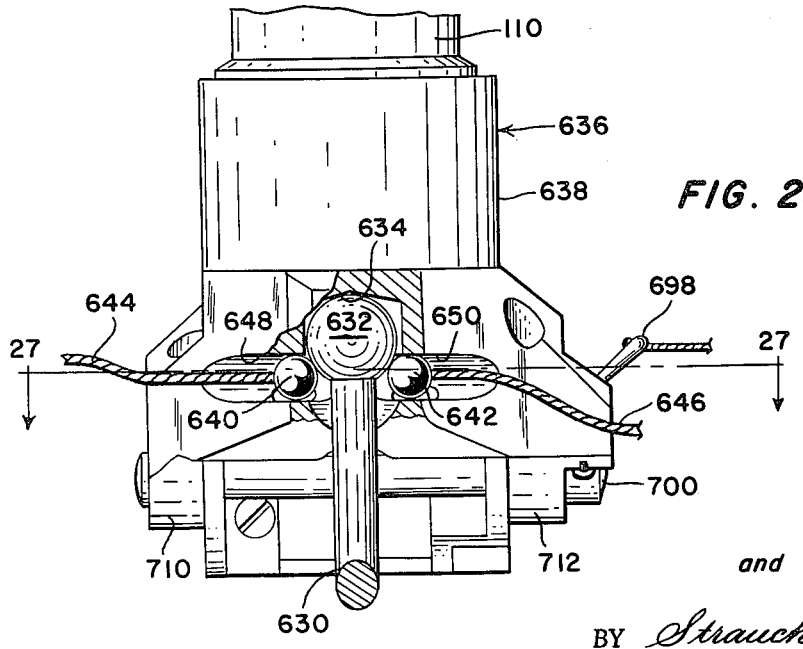
Figure 26:
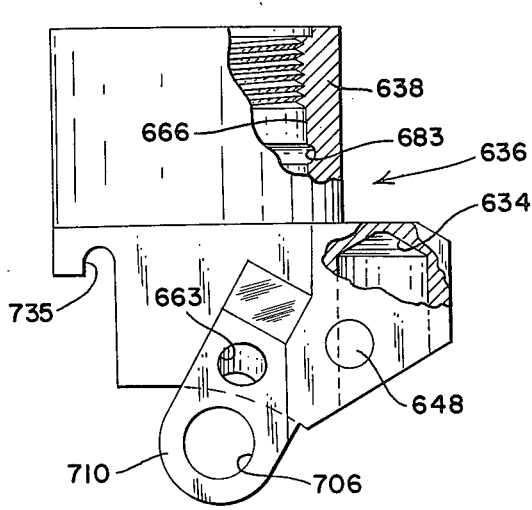
Figures 28, 29, 30:
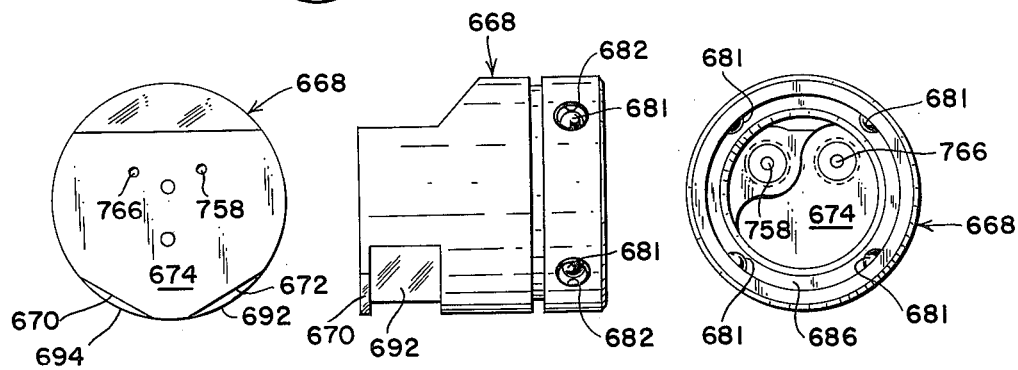
Figure 32:
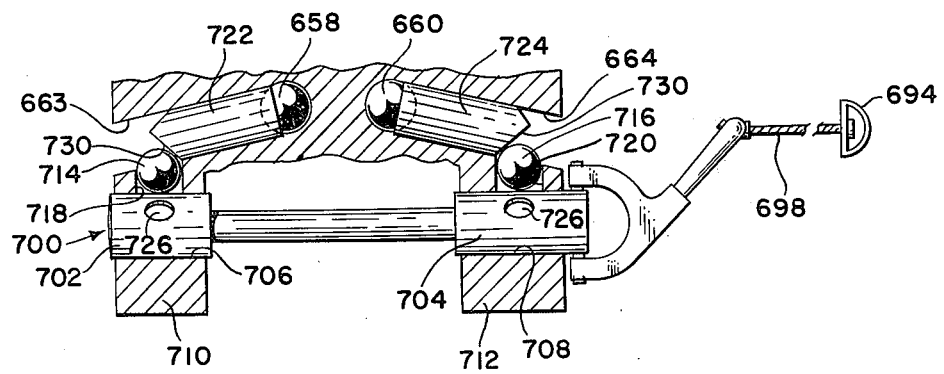
Figure 27:
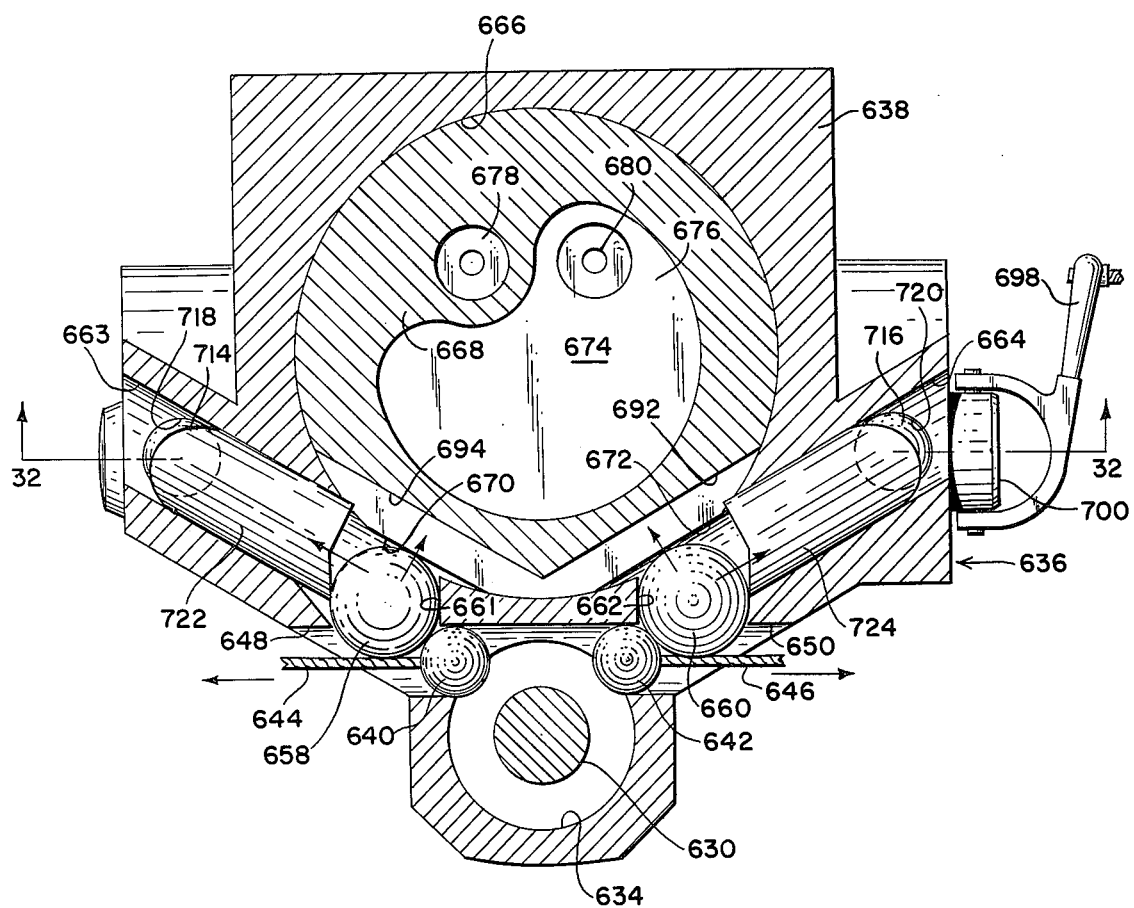
Figure 37:
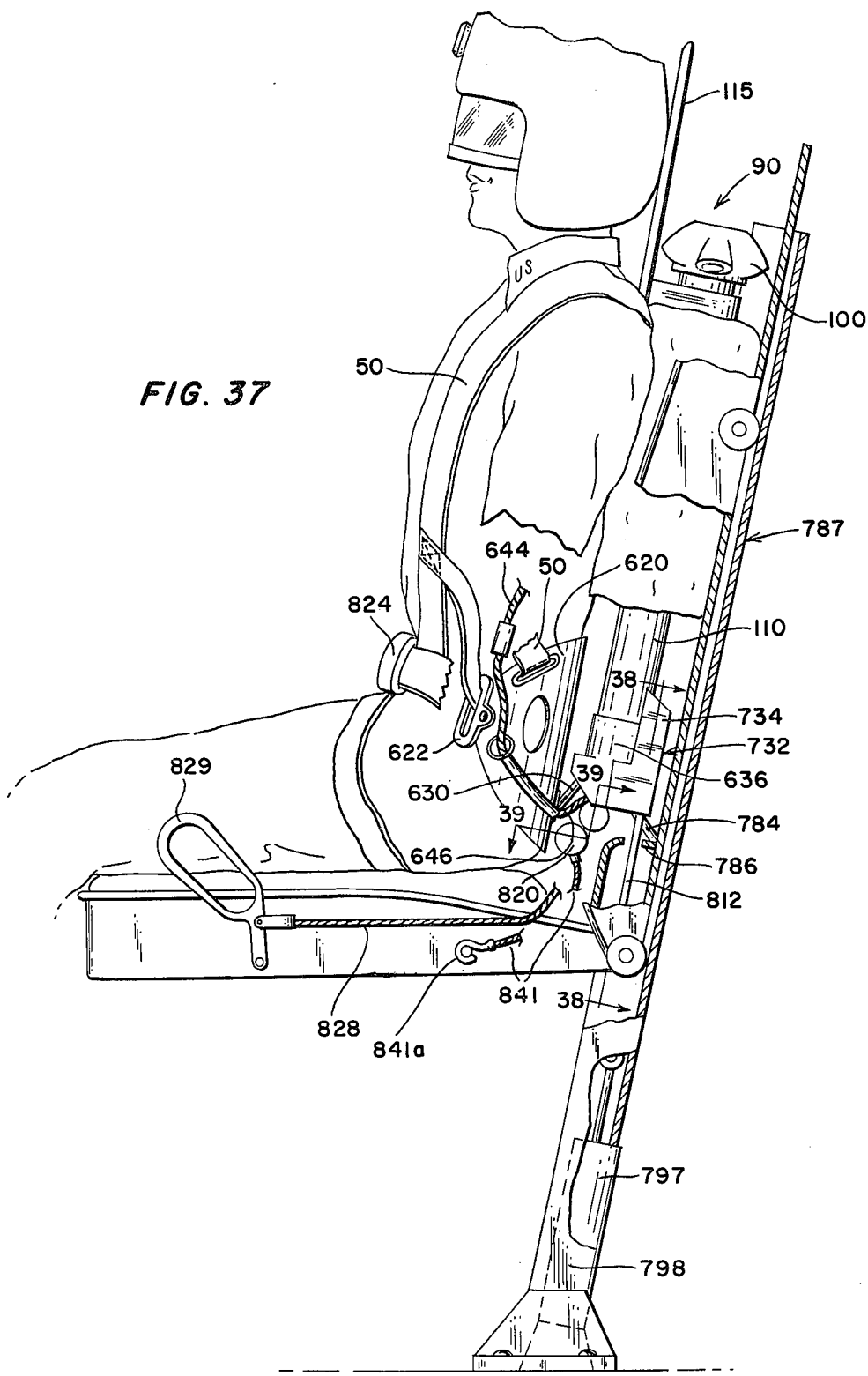

FIGS. 11A–F illustrate the preferred sequence of steps in making a parachuted recovery with the rocket-extracted ballistically-opened parachute assembly of this invention;

FIGS. 11G–J show the automatic backup operations which take place in the event of a malfunction;

FIG. 12 is a section taken substantially along lines 12—12 of FIG. 6 and illustrating details of the spreader head assembly;

FIG. 13 is a section taken substantially along lines 13—13 of FIG. 4;

FIG. 14 is a section taken substantially along lines 14—14 of FIG. 13;

FIG. 15 is a section taken substantially along lines 15—15 of FIG. 14;

FIG. 16 is an enlarged section taken substantially along lines 16—16 of FIG. 12;

FIG. 17 is a section taken substantially along lines 17—17 of FIG. 12;

FIG. 18 is an enlarged, fragmentary, longitudinal section taken substantially along lines 18—18 of FIG. 16 and illustrating details of the assembly for projecting the spreader weights to open the canopy of the recovery parachute;

FIG. 19 is a longitudinal section of the firing mechanism for the spreader head assembly shown in FIG. 16;

FIG. 20 is a perspective view of a further embodiment of a parachute assembly constructed according to this invention and illustrating a rocket-extracted, rocket-opened parachute assembly which is especially useful for the recovery of large cargo;

FIGS. 21 and 21A respectively are enlarged forward and aft longitudinal sections of one of the spreader rocket assemblies shown in FIG. 20;

FIG. 22 is a fragmentary section similar to that of FIG. 21A, but showing the parts of the spreader rocket assembly in operating position for opening the parachute canopy;

FIG. 23 is a rear elevation of a further embodiment of this invention with the outer parachute bag broken away to show interior details;

FIG. 24 is a section taken substantially along lines 24—24 of FIG. 23;

FIG. 25 is a section taken substantially along lines 25—25 of FIG. 24;

FIG. 26 is a partially sectioned side elevation of the rocket-launching, igniter housing shown in FIGS. 24 and 25;

FIG. 27 is a section taken substantially along lines 27—27 of FIG. 25;

FIG. 28 is a top plan view of the rocket-launching cartridge casing illustrated in FIGS. 24 and 25;

FIG. 29 is a side elevation of the cartridge casing illustrated in FIG. 28;

FIG. 30 is a bottom plan view of the cartridge casing illustrated in FIGS. 28 and 29;

FIG. 31 is a section taken substantially along lines 31—31 of FIG. 24;

FIG. 32 is a section taken substantially along lines 32—32 of FIG. 27;

FIG. 33 is an elevation of a pack and stabilizing parachute bridle line release shaft illustrated in FIGS. 31 and 32;

FIG. 34 is a front elevation of the firing mechanism for igniting the rocket launching cartridges;

FIG. 35 is a side elevation of the firing mechanism illustrated in FIG. 34;

FIG. 36 is a section taken substantially along lines 36—36 of FIG. 24 and illustrating a bottom plan view of the firing mechanism shown in FIGS. 34 and 35;

FIG. 37 is a side elevation illustrating the parachute pack assembly of FIG. 23 mounted on a vehicle seat and strapped to the wearer's back;

FIG. 38 is a section taken substantially along lines 38—38 of FIG. 37;

FIG. 39 is a section taken substantially along lines 39—39 of FIG. 37 and illustrating details of the aneroid timer and firing mechanism arming assembly;

FIGS. 40A–40D illustrate the preferred sequence of steps in making a parachuted recovery with a further modified rocket-extracted, ballistically-opened parachute assembly in which the recovery parachute is contained in a sleeve and is deployed from the parachute pack with the suspension lines being paid out through the top of the pack;

FIGS. 40E and 40F show the automatic back-up operations which take place in the event of a malfunction of the parachute assembly illustrated in FIGS. 40A–40D;

FIG. 41 is an enlargement of the lower end of the canopy sleeve and illustrating details of locking cone and pin assemblies for retaining the bottom of the canopy sleeve closed until the parachute reaches line stretch;

FIG. 42 illustrates a modification of the parachute assembly shown in FIGS. 40A–40F; and FIG. 43 illustrates the recovery of an encapsulated seat with the parachute assembly of this invention.

The various embodiments of the present invention are illustrated and described herein to incorporate a tractor-type rocket for deploying the parachute pack or canopy away from the person or cargo to be recovered. It will be appreciated especially by those skilled in the art, however, that several features of this invention such as, for example, the novel canopy spreader mechanisms, are also readily applicable for use with conventional ballistic gun-type devices for deploying parachutes.

Figure 1:
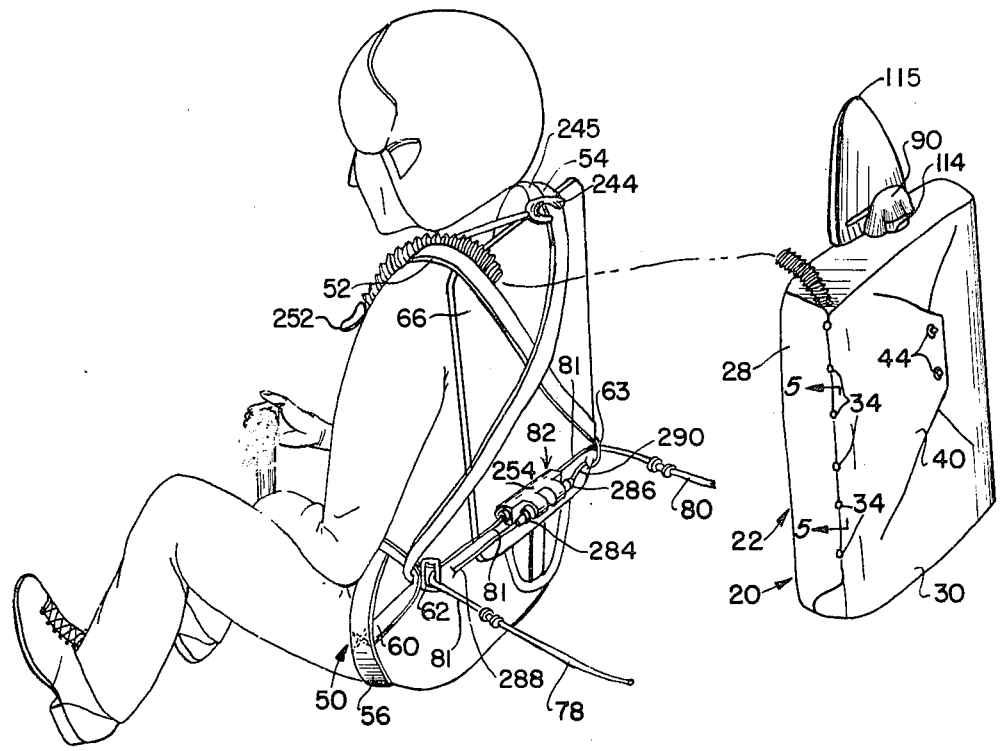
FIG. 1 is a perspective, partially exploded view of the rocket extracted, ballistically opened parachute pack assembly of this invention.
Figure 2:
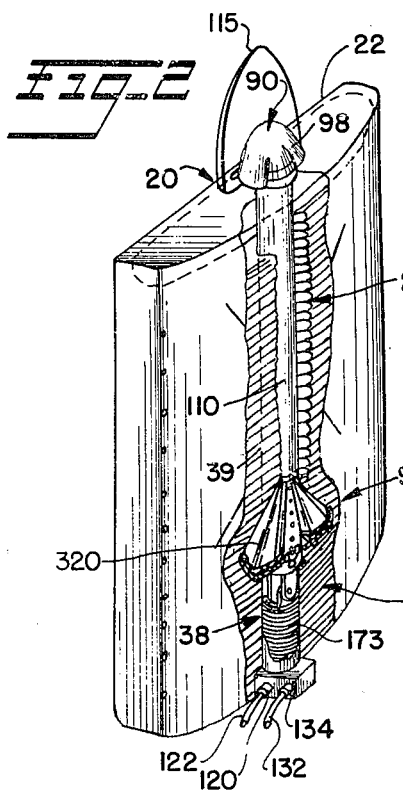
FIG. 2 is a perspective view of the parachute pack illustrated in FIG. 1 as seen from the left, aft corner thereof with the outer bag broken away to illustrate interior details.

Referring now in detail to the drawings and more particularly to FIGS. 1 and 2, the reference numeral 20 generally designates a parachute pack incorporating the present invention and comprising a recovery parachute 26 contained in an outer bag 22, a stabilizing pilot parachute 24 (see FIG. 9), and an apparatus 27 for quickly deploying and spreading parachute 26. Bag 22 is formed with two half sections 28 and 30 respectively defining the forward and aft portions of the envelope containing parachute 26 and apparatus 27. Sections 28 and 30 are releasably secured together by two rows (one shown in FIG. 1) of conventional cone shaped fasteners 34 disposed one on each side of pack 20. Fasteners 34, as best shown in FIG. 5, are secured to the marginal side edge of section 30 and extend through reinforced holes 36 in the overlapping marginal side edge of section 28. Pull pins 37 extending through fasteners 34 secure sections 28 and 30 together. By removing pins 37, sections 28 and 30 separate to permit parachute 26 to be deployed in a manner to be described in detail later on.

As shown in FIG. 2, parachute 26 is essentially of conventional form and comprises a plurality of suspension lines 38 secured to the periphery of a canopy 39. Canopy 39 is folded in overlapping, annular layers in the upper region of bag 22 and has its apex disposed adjacent to the top of pack 20. Suspension lines 38 are stowed in the lower portion of bag 22 below canopy 39 and are folded in such a manner as to permit them to be payed out through the bottom of pack 20.

Figure 10:
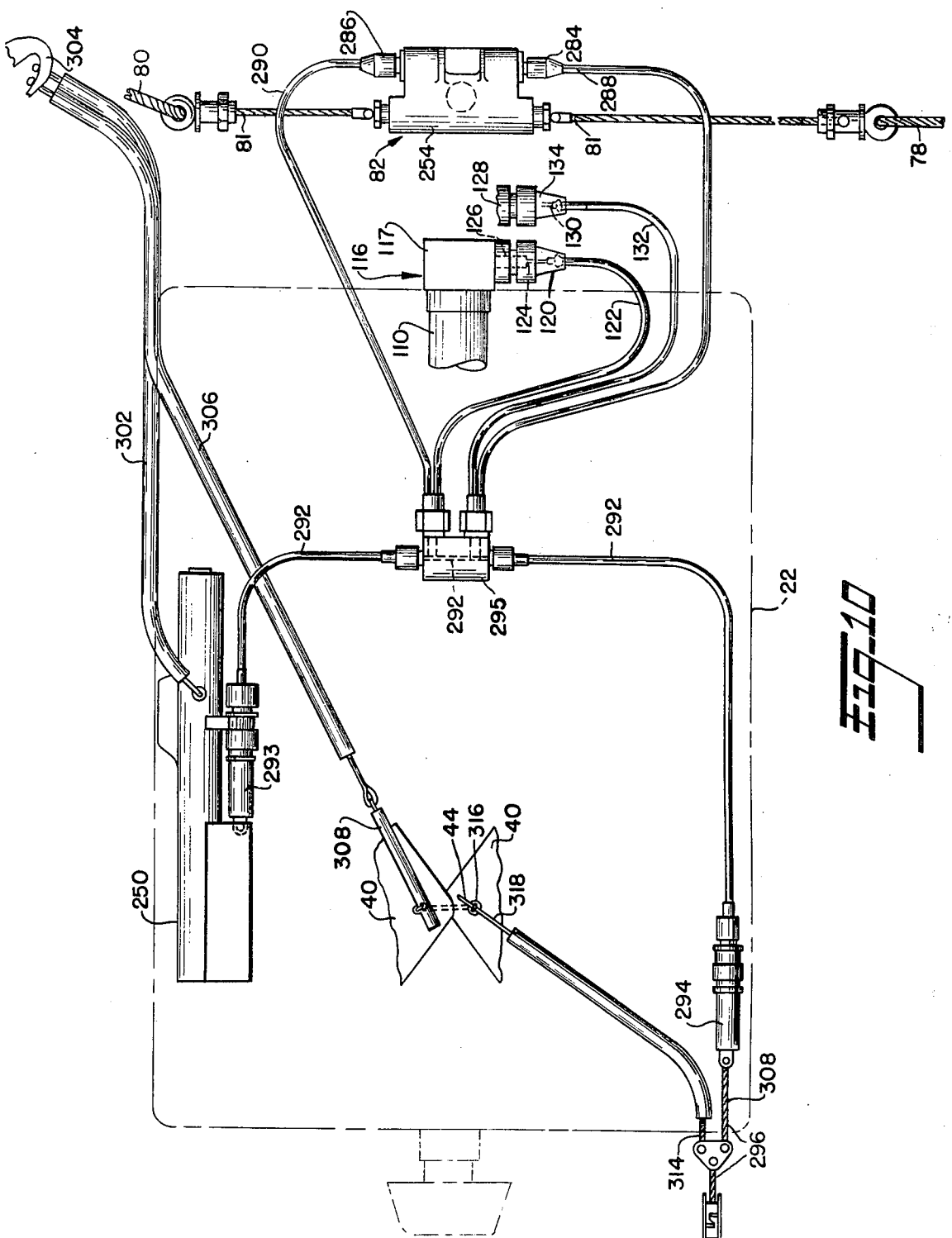
FIG. 10 is a partially schematic view of the control system for providing a parachuted recovery of a person.
Figure 11:
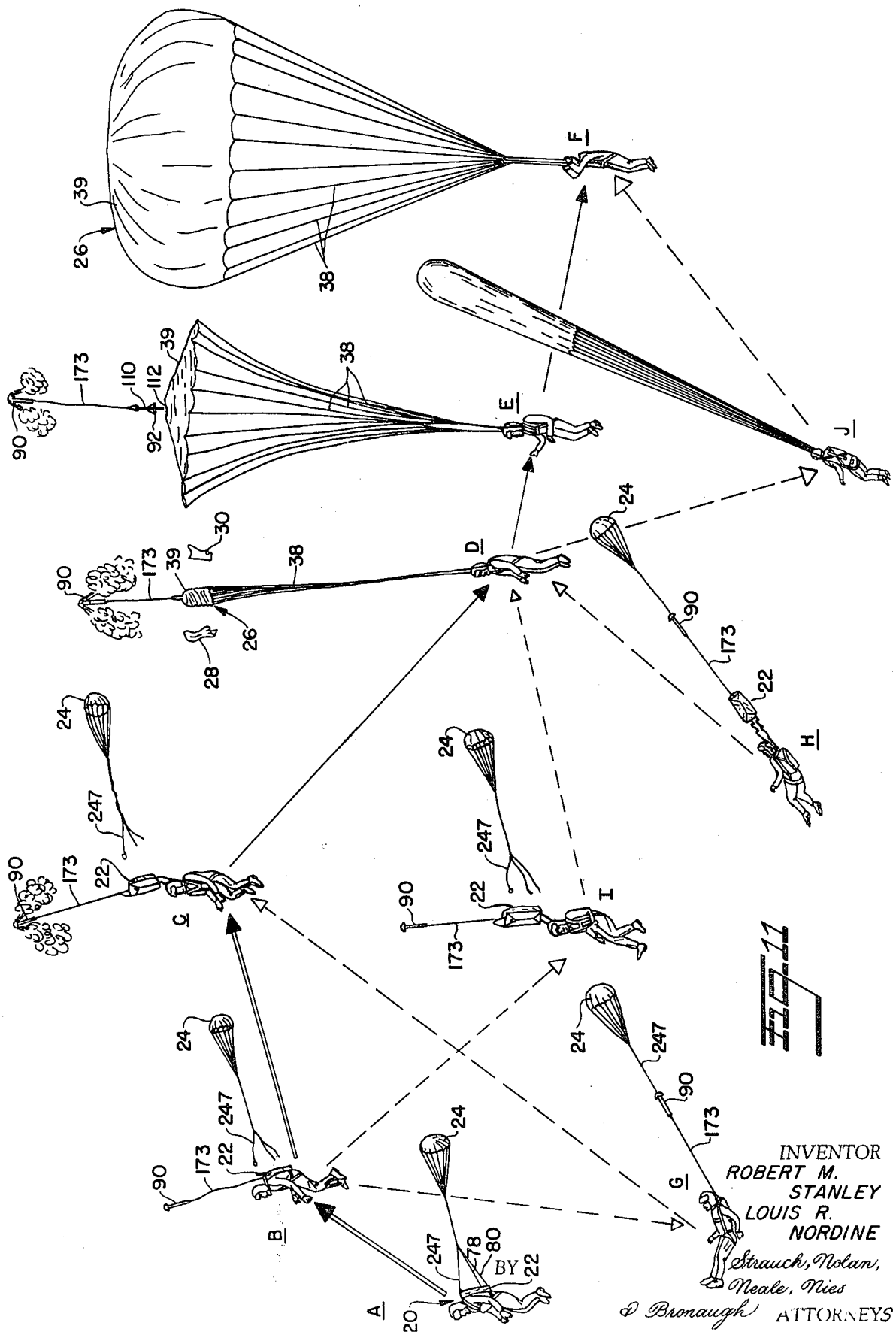

With reference to FIGS. 1 and 10, section 30 is provided with four flaps 40 which define a compartment for receiving stabilizing parachute 24. Chute 24 is conventionally spring loaded in this compartment and is confined against deployment by flaps 40 which are releasably retained together by a lock pin and loop fastener assembly 44 to be described in greater detail later on. When flaps 40 are released, the spring loading deploys stabilizing chute 24 rearwardly.

With continued reference to FIG. 1, a harness 50 is worn by the person for securing pack 20 to his back. Harness 50 may be of any suitable, conventional form and may comprise a pair of left and right straps 52 and 54 which are each sewn to form loops 56 (not shown) extending around the wearer's thighs. Straps 52 and 54 extend upwardly from loops 56, pass over the wearer's shoulders on opposite sides of his head, and cross over at the middle of his back. From the cross-over region straps 52 and 54 loop around separate strap portions 60 and are joined together across the wearer's back to form a cross strap section 64. Bridle rings 62 and 63 are sewn to strap section 64 for a purpose to be described shortly.

As shown in FIG. 1, straps 52 and 54 snugly secure a stiff support pad 66 to the wearer's back to uniformly distribute forces imposed during deployment of parachute 26.

Figure 3:
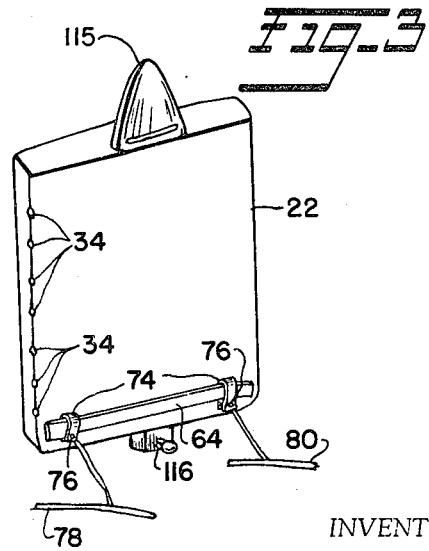
FIG. 3 is another perspective view showing the forward face of the parachute pack illustrated in FIG. 1.

A pair of clips 74 for supporting pack 20 on harness 50 are, as shown in FIG. 3, secured to section 28 along the lower marginal edge of bag 22 facing the wearer's back. Clips 74 detachably hook over strap section 64 and are apertured to receive locking pins 76 which prevent pack 20 from moving upwardly relative to harness 50. Pins 76 are respectively secured to a pair of lower bridle lines 78 and 80 (see FIGS. 1 and 9) for stabilizing chute 24. By deploying stabilizing chute 24, bridle lines 78 and 80 are pulled taut to pull pins 76 out of clips 74 and thereby free pack 20 for upward movement. The means for keeping the top of pack 20 against the man's shoulders will be described later on.

Bridle lines 78 and 80, as shown in FIG. 1, are respectively routed through bridle rings 62 and 63 and are joined together by a cable 81 extending across the wearer's back in the region of strap section 64. A cable cutter and pack support assembly 82, to be described in detail later on, is mounted on pad 66 for cutting cable 81.

Referring now to FIGS. 2, 4, and 6, apparatus 27 for deploying and opening parachute 26 comprises an upstanding launching tube 110, an extraction rocket 90 slidably stored in tube 110, and a canopy spreader assembly 92 mounted on tube 110. Rocker 90, as best shown in FIG. 6, is of the tractor-type having a tubular casing 94 which defines a combustion chamber 96 for receiving a suitable gas-generating propellant indicated at 97. Mounted on casing 94 at the upper or advancing end of rocket 90 is a nozzle assembly 98 comprising a nozzle housing 100 which mounts a pair of rearwardly, outwardly, and slightly tangentially directed nozzles 102 and 104. Nozzles 102 and 104 are on diametrically opposite sides of rocket 90 and define gas venturi passages which communicate with combustion chamber 96. The gas generated by burning propellant 97 is exhausted through nozzles 102 and 104 to effectively pull rocket 90 through the air. Nozzles 102 and 104 are so directed as to impart to rocket 90 during its ignited flight a stabilizing spin in a predetermined direction about the rocket longitudinal axis. Assembly 82, in a manner to be described in detail shortly, releasably secures launching tube 110 to pad 66 and thus to the back of the wearer.

With continued reference to FIG. 2, canopy 39 is packed around launching tube 110 and is formed at its apex with an unobstructed vent hole 112 (see FIG. 11E) through which the upper end of tube 110 and rocket 90 freely extend. As shown, canopy 39 and suspension lines 38 are stowed in surrounding relation to launching tube 110. The lower peripheral skirt portion of canopy 39 is disposed immediately above spreader assembly 92 and lines 38 are folded in the stowage space below spreader assembly 92. The forward end of rocket 90 including nozzle assembly 98 projects upwardly beyond the upper end of launching tube 110 and through an opening 114 (FIG. 1) formed in the top of bag 22.

Launching tube 110 supports a headrest 115 for the comfort and safety of the wearer of pack 20. Headrest 115 prevents the wearer's head from moving into the launching path of rocket 90.

As best shown in FIG. 7, a breech assembly 116 for launching rocket 90 from tube 110 comprises a hollow igniter housing 117 defining an ignition chamber 118 and having a bored boss 119 coaxially extending into the bottom end of tube 110. Housing 117 is suitably fixed to tube 110 and mounts a fitting 120 to which a conduit 122 is secured. Conduit 122 contains a mild detonating fuse 124 which is fired by means to be described later on to detonate a conventional primer and cartridge assembly 126 in ignition chamber 118.

As shown in FIG. 10, a second conventional primer and cartridge assembly 128 is mounted in chamber 118 and is detonatable by a mild detonating fuse 130. Fuse 130 is contained in a suitable conduit 132 which is secured to a fitting 134. Fitting 134 is fixed to housing 117 adjacent to fitting 120.

The expanding gases generated by detonation of cartridge assemblies 126 and 128 pass through a bore 136 formed in boss 119 and enter into the lower end of launching tube 110 to urge a rocket pusher assembly 160 upwardly for launching rocket 90. Pusher assembly 160, as shown in FIGS. 7 and 8, comprises a lower sabot piston 162 and an upper piston cap 164 which are spaced apart by a piston sleeve 166. Piston 162, cap 164, and sleeve 166 are coaxially, and slidably received in the lower end of launching tube 110 below rocket 90. Piston 162 is seated on a flat annular surface defined by boss 119 and has its bottom face exposed to ignition chamber 118. Sleeve 166 is seated on the upwardly facing surface of piston 162, and cap 164 is seated on the upper end of sleeve 166. A groove-seated O-ring 168 carried by piston 162 is pressed against the internal peripheral wall surface of launching tube 110 to establish a fluid tight seal between piston 162 and tube 110. An O-ring 169 seated between launching tube 110 and boss 119 prevents gas in chamber 118 from escaping between the opposed peripheral surfaces of tube 110 and boss 119.

To mount rocket 90 in launching tube 110, a support member 170, as best shown in FIG. 8, has an annular shoulder 172 seated on the top surface of cap 164. Member 170 is formed with a yoked end 173a which extends downwardly through an aperture in piston cap 164. A tow line 173 coiled in sleeve 166 is permanently secured at opposite ends to piston 162 and to the yoked end 173a of support member 170.

With continued reference to FIG. 8, a swivel assembly 176 secured to the aft end of rocket 90 mounts rocket 90 on support member 170. Swivel assembly 176 comprises a fitting 178 having an elongated, reduced diametered section 180 which extends coaxially rearwardly from rocket 90 and which is threaded into an upwardly opening, tapped bore 182 formed in support member 170 above piston cap 164. Fitting 178 is coaxially formed with a stepped through bore 184 which slidably receives a bolt 186. Bolt 186 is formed with a smooth shank section 190 which extends downwardly through a reduced diametered section 192 of stepped bore 184. At its lower end, the head of bolt 186 is slidably received in an enlarged section 194 of stepped bore 184 and seats on a flat internal surface 198 delimiting the bottom of bore 182. With this construction, bolt 168 is axially displaceable relative to fitting 178 and support member 170. Upward displacement of bolt 186 is limited by abutment of the bolt head with an internal downwardly facing shoulder 199 formed in stepped bore 184. Downward displacement of bolt 186 relative to fitting 178 is limited by abutment of the bolt head with surface 198.

With continuing reference to FIG. 8, the upper end of bolt 186 is rotatably received in a downwardly opening bore 200 formed coaxially in a cylindrical extension housing 202. Extension housing 202 is coaxially fixed to the aft end of casing 94 within launching tube 110. Suitable bearings 204 and 205 journal bolt 186 for rotation relative to extension housing 202. The upper end of bolt 186 extending into housing 202 is threaded into a nut assembly 206. Nut assembly 206 seats against bearing 204 which, in turn, is seated on an internal upwardly directed surface in housing 202 to prevent downward axial displacement of bolt 186 relative to housing 202.

By urging pusher assembly 160 upwardly as a result of detonating cartridge assemblies 126 and 128, support member 170 and fitting 178 are displaced upwardly as a unit to propel rocket 90 in its unignited condition upwardly and out of launching tube 110. When pusher assembly 160 reaches the upper end of launching tube 110, piston cap 164 engages a downwardly facing annular shoulder 210 (FIG. 6) formed on tube 110. As a result, further upward displacement of pusher assembly 160 relative to launching tube 110 is prevented. Rocket 90, still unignited, continues to move upwardly and away from tube 110 as a result of the launching force previously applied by pusher assembly 160.

Tow line 173 uncoils and is pulled taut by the unignited flight of rocket 90 away from launching tube 110. When tow line 173 is pulled taut and pulls down on member 170, a pair of firing mechanisms 220 and 222 are automatically actuated to ignite the propellant in rocket 90 in a manner now to be described.

As best shown in FIG. 8, firing mechanism 220 comprises a firing pin 224 and a disconnect pin 226 having notched interlocking ends. Pins 224 and 226 are coaxially and slidably mounted in a stepped bore 230 formed in housing 202 along an axis extending parallel to but laterally offset from longitudinal axis of rocket 90. A coiled spring 232 surrounding a reduced diametered section of firing pin 224 reacts against a shoulder 233 in bore 230 to urge firing pin 224 forwardly to a position where it is engageable to fire a detonator 234.

With continued reference to FIG. 8, disconnect pin 226 extends rearwardly beyond stepped bore 230 and freely through an axially aligned bore formed in a cylindrical end plate section 235 of fitting 178. Section 235 is preferably formed integral with section 180 and has a flat upwardly facing surface 236 on which rocket 90 is seated when stored in launching tube 110. The diameter of end section 235 is substantially equal to the diameter of extension housing 202 to provide a firm support for rocket 90.

With continuing reference to FIG. 8, disconnect pin 226 is formed at its lower end with enlarged head 238 which is biased by spring 232 into engagement with the lower face of section 235. With the position of parts shown in FIG. 8, disconnect pin 226 retains firing pin 224 in a rearwardly retracted position against the bias of spring 232.

The tension applied by pulling tow line 173 taut as a result of launching rocket 90 from tube 110 shifts fitting 178 rearwardly along bolt 186 to pull disconnect pin 226 and firing pin 224 rearwardly to compress spring 232. When the adjacent, notched ends of disconnect pins 224 and 226 clear the rearward end of stepped bore 230, the upper end of pin 226 shifts laterally. As a result, pin 226 separates from pin 224 to allow spring 232 to urge pin 224 forwardly to fire detonator 234. Firing of detonator 234 detonates a charge 242 to ignite the main body of rocket propellant 97.

Firing mechanism 222 is of the same construction as firing mechanism 220 and is actuated simultaneously with mechanism 220 to ignite charge 242. Like reference numerals have been used to designate the parts of firing mechanism 222 corresponding to mechanism 220.

As best shown in FIGS. 1 and 4, the forward end of rocket 90 projecting beyond launching tube 110 slidably extends through a C-ring disconnect fitting 244 which is secured by retention straps 245 to harness 50. Fitting 244 grips rocket 90 to hold the top of pack 20 against the wearer's shoulders.

With continued reference to FIGS. 4 and 9, the forward protruding end of rocket 90 also slidably extends through a further disconnect fitting 246 which is similar to fitting 244. Fitting 246 is secured to an upper bridle line 247 for stabilizing chute 24. When rocket 90 is launched from tube 110, it unlocks disconnect fittings 244 and 246 to free the top of pack 20 from harness 50 and to release upper bridle line 247.

Referring now to FIG. 10, deployment of parachute 26 usually is initiated automatically by activation of a suitable, conventional aneroid timer 250. Alternatively, deployment of parachute 26 may be initiated manually by pulling a D-ring 252. In a manner to be described in greater detail shortly, cutter and support assembly 82 is actuated either by activation of aneroid timer 250 or by pulling D-ring 252 to cut cable 81 for releasing lower bridle lines 78 and 80 from attachment to pad 66 and also for releasing launching tube 110 for displacement with pack 20 relative to the person to be recovered.

Assembly 82, as best shown in FIGS. 13–15, comprises a rigid housing 254 which is fixed to pad 66 below pack 20. Housing 254 is formed with axially aligned bores 256 and 258 which open outwardly in opposite directions and which intersect with a milled slot 260 at their inner ends. Slot 260 opens rearwardly and upwardly for a purpose to be explained shortly.

With continued reference to FIGS. 13–15, cable 81 is routed through bores 256 and 258 and slot 260. Suitable tension bolt and keeper assemblies 262 and 264 respectively mounted in the oppositely facing outer ends of bores 256 and 258 secure cable 81 to housing 254. A keeper 266 received in slot 260 bears against the portion of cable 81 passing through slot 260 to seat cable 81 against a pair of anvils 268 and 270. Anvils 268 and 270 are respectively threaded into bores 272 and 274 formed in housing 254 along parallel spaced apart axes as shown.

A piston 276 formed integral with a cable cutter 278 is slidably mounted in bore 272. Similarly, a piston 280 formed integral with a cable cutter 282 is slidably mounted in bore 274. Cutters 278 and 282 are on the side of cable 81 opposite from anvils 268 and 270 and are projected upwardly by suitable gas generator units 284 and 286 mounted in opposite sides of housing 254.

As shown in FIG. 10, gas generator units 284 and 286 may comprise suitable cartridges which are separately detonated by mild detonating fuses 288 and 290. Fuses 288 and 290 are simultaneously fired by a mild detonating fuse 292 in a junction box 295. Fuse 292 is detonated by an igniter 293 or, alternatively, by an igniter 294. Igniters 293 and 294 are of any suitable, conventional form. Igniter 293 is operatively connected to an aneroid timer 250. Igniter 294 is operatively connected by a suitable cable and disconnect assembly 296 to D-ring 252.

Activation of aneroid timer 250 pulls igniter 293 to detonate fuse 292 which, in turn, detonates fuses 288 and 290 simultaneously. As a result, gas generating units 284 and 286 are simultaneously detonated to generate gas for projecting cutters 278 and 282 to sever cable 81. Alternatively, activating igniter 294 by pulling D-ring 252 accomplishes the same result.

As best shown in FIGS. 13 and 14, keeper 266 is seated on a cylindrical mounting pin 298 which is seated in slot 260 and which is formed integral with a rearwardly extending shank portion 299. Shank portion 299 is fixed by any suitable means such as a pin 300 to a mounting plate 301. The tension applied by cable 81 before it is cut seats pin 298 firmly on an internal surface of housing 254 to thus supportingly secure housing 117 and launching tube 110 to housing 254. Thus, when cable 81 is cut, pin 298 is freed for upward movement through slot 260. With this construction, pin 298 separates from housing 254 when launching tube 110 together with housing 117 is pulled upwardly by rocket 90 or by the drag applied by stabilizing parachute 24 if the rocket launching mechanism malfunctions in a manner to be described in greater detail shortly.

To automatically initiate a recovery sequence, aneroid timer 250 advantageously is operatively connected by a timer arming lanyard 302 (see FIG. 10) to an over-the-side, seat-mounted release member 304. Member 304 is also connected by a lanyard 306 to a reefing line cutter 308 which is operable to cut fastener 44 for releasing stabilizing parachute 24. Timer 250 is preferably secured to the forward face of bag 22.

In the fully automatic escape sequence, the occupant to be recovered is ejected or extracted from the aircraft or other vehicle by any suitable, well-known means producing tension in lanyards 302 and 306. Cutter 308 producing tension in response to the tension applied through lanyard 306 is fired after a short delay to cut fastener 44 and thereby release stabilizing parachute 24. Timer 250 is started by pulling lanyard 302 taut and, after a predetermined delay, pulls igniter 293 which, as previously described, is connected to detonate fuse 292 for firing gas generating units 284 and 286 to release the lower bridle lines of stabilizing parachute 24 and also to release pack 20 for upward movement relative to assembly 82. Simultaneous with the release of lower bridle lines 78 and 80 and of pack 20, cartridges 126 and 128 are detonated by fuses 124 and 130 which are detonated by fuse 292. The gases generated by detonating cartridges 126 and 128, launch rocket 90 in its unignited condition from launching tube 110 in the manner already explained. When rocket 90 moves out of launching tube 110, fitting 246 is unlocked to release upper bridle line 247, thereby freeing stabilizing parachute 24 from pack 20 as shown in FIG. 11B. In addition, fitting 244 is also unlocked by movement of rocket 90 out of launching tube 110 to free the upper end of pack 20 from harness 50. As a result, pack 20 is freed at this stage for upward movement relative to harness 50.

After the rocket has moved about 7 feet from pack 20, tow line 173 is pulled taut, thus igniting rocket 90 in the manner previously explained. Once ignited, rocket 90 pulls pack 20 away from the man at an angle of about 90 degrees to the man's resultant velocity vector as shown in FIG. 11C. As rocket 90 pulls pack 20 away, suspension lines 38, which are secured by bridles to harness 50, are payed out through the bottom of pack 20.

When suspension lines 38 reach approximately 80 to 85% stretch, pins 37, which are secured to lines 38 by a lanyard 310 (see FIG. 5), are pulled from fasteners 34 to separate sections 28 and 30 of bag 22 as shown in FIG. 11D. Further flight of rocket 90 to stretch suspension lines 38 to about 90% of their full stretched-out lengths automatically actuates spreader assembly 92 in a manner to be described shortly to open canopy 39 as shown in FIG. 11E.

Firing of spreader assembly 92 and separation of the canopy spreading weights in assembly 92 releases canopy 39 from spreader assembly 92 which is pulled upwardly through vent hole 112 in canopy 39 by the residual thrust of rocket 90. Sufficient propellant is left in rocket 90 at this stage to carry launching tube 110 together with spreader assembly 92 safely away from the person being recovered and parachute 26 which is beginning to inflate as shown in FIG. 11E. Thus, rocket 90 effects safe removal of launching tube 110 and spreader assembly 92 to eliminate the hazard of these parts falling on the man when he lands. The final recovery stage is shown in FIG. 11F where parachute 26 is now fully inflated to provide a safe descent to the ground.

In the event that the launching mechanism of rocket 90 malfunctions, fitting 246 remains connected to rocket 90. As a result, the drag applied by stabilizing parachute 24 after bridle lines 78 and 80 are disconnected pulls rocket 90 out of launching tube 110 in the manner shown in FIG. 11G. The weight of the falling man or cargo cooperating with stabilizing parachute 24 thus tensions tow line 173 to ignite rocket 90 in the manner already explained.

In the event rocket 90 fails to fire after it is pulled out of launching tube 110 by parachute 24, the drag applied by parachute 24 in tensioning tow line 173 separates pack 20 from harness 50 to pay out suspension lines 38 as shown in FIG. 11H. Paying out of suspension lines 38 results in separation of sections 28 and 30 of bag 22 and in firing of spreader assembly 92.

If rocket 90 does not ignite after it is properly launched from launching tube 110, the inertia of the upwardly moving rocket separates pack 20 from harness 50 as shown in FIG. 11I. The drag of pack 20 moves it away from the man to pay out suspension lines 38.

If it is desired to manually activate the recovery system of this invention as would be necessary when bailing out over the side, D-ring 252 is pulled after bail-out to bypass aneroid timer 250 and all the previously mentioned time delays. D-ring 252 in addition to being operatively connected to igniter 294, is also connected by a cable 314 to a locking pin 316 which is mounted in a conventional fastener 318 forming a part of fastener assembly 44.

Pulling D-ring 254 releases flaps 40 permitting stabilizing parachute 24 to be deployed under its spring action, in addition to firing gas generating units 284 and 286 for releasing pack 20 and rocket 90 from the man to be recovered and disconnecting the lower bridle lines 78 and 80 of pilot parachute 24.

A fairing shield 320 (see FIG. 6) fixed to launching tube 110 above spreader assembly 92 provide surfaces which diverge outwardly generally in the form of a cone to guide canopy 39 over spreader assembly 92 as tube 110 is pulled through vent hole 112.

Referring now to FIGS. 12 and 17, spreader assembly 92 is shown to comprise a collar 330 coaxially fixed to launching tube 110 about midway between the ends thereof. Collar 330 is coaxially received in a hub 332 of a rigid spreader head 334 and is threaded at its lower end to receive a nut 336. At its upper end, collar 330 is formed with a flange 338 which seats on the upper surface of spreader head 334 and which cooperates with nut 336 to confine spreader head 334 against axial displacement relative to collar 330 and launching tube 110.

With continued reference to FIGS. 12 and 17, spreader head 334 is integrally formed with a pair of thick, diametrically opposed plate sections 340 and 342 extending radially from hub 332 and interposed between canopy 39 and suspension lines 38 in pack 20. Sections 340 and 342 extend from the center toward the opposite sides of pack 20 to minimize the thickness of pack 20, thus rendering pack 20 easily disposable between the seat back in an aircraft or the like and an occupant.

Still referring to FIGS. 12 and 17, section 340 is formed with a series of angularly spaced apart, stepped bores 344, 345, 346, and 347 having longitudinal axes contained in a common plane extending at right angles to the longitudinal axis of launching tube 110. Bores 344–347 open outwardly at the periphery of section 340 and may intersect at a common point located near hub 332. As shown, bores 344 and 347 may be axially aligned and respectively open in generally forward and aft directions. Bores 345 and 346 open generally toward the side of pack 20.

The construction of plate section 342 is the same as that just described for plate section 340 except that the bores in section 342 are arranged oppositely with respect to bores 344–347 in section 340. Accordingly, like reference numerals have been used to designate corresponding bores in section 342.

As best shown in FIG. 12, bores 344–347 respectively receive weight assemblies 350, 351, 352, and 353. Weight assembly 350, as shown in FIG. 18, comprises a projectile or weight 358, projecting beyond bore 344, which is connected by a lanyard 360 to the periphery of canopy 39. Weight 358 is coaxially formed with a stepped through bore 362 which coaxially receives a cylinder 364. The outer diameter of cylinder 364 is stepped to provide an outwardly facing, annular land 366 which seats against a rearwardly facing, annular shoulder 368 formed in stepped bore 362.

With continued reference to FIG. 18, cylinder 364 comprises a sleeve that is open at both ends and is integrally formed with an inner threaded section 370 which is threaded into an enlarged tapped section of bore 344. A flange 371 formed integral with cylinder 364 seats against the periphery of plate section 340 as shown. A groove seated O-ring 372 surrounding section 370 is axially compressed against the inwardly facing surface of flange 371 to provide a fluid tight seal. Slidably received in cylinder 364 is a captive piston 376 which separably abuts a piston rod 378. Piston rod 378 extends through the outer open end of cylinder 364 and terminates in a tapered end section 380 which extends into a tapered bore section 382 of stepped bore 362. Outward displacement of piston 376 pushes piston rod 378 ahead of it to wedge section 380 into bore section 382. A shear pin 384, fixing piston rod 378 to cylinder 364, fails when pressure is applied to piston 376.

By introducing fluid pressure into bore 344 piston 376 and rod 378 are outwardly displaced. Outward displacement of piston 376 is limited by engagement with an inwardly facing annular shoulder 386 formed in cylinder 364. A groove seated O-ring 388 carried by piston 376 engages the internal peripheral wall surface of cylinder 304 to establish a fluid tight seal that prevents gases from passing through the outer end of cylinder 364 and objectionably contacting canopy 39. Cylinder 364 is formed adjacent its outer end with a vent hole 390 which permits trapped air on the outwardly facing side of piston 376 to escape from cylinder 364 as piston 376 is thrust outwardly.

With continued reference to FIG. 18, bore 362 is formed with an enlarged diametered section adjacent its inner end to define a skirt 392 which is radilly spaced from cylinder 364. Received in the annular space delimited by skirt 392 and cylinder 364 is a coiled compression spring 394 which reacts against flange 371 to bias weight 358 outwardly.

Assemblies 351–353 are of the same construction as assembly 350. Accordingly, like reference numerals have been used to designate like parts. Weight assemblies 400, 401, 402, and 403 are of the same construction as assemblies 350–353 and are respectively mounted in bores 344–347 of plate section 342.

As best shown in FIG. 12, a thin, flexible, cable 406 extends around the peripheries of plate sections 340 and 342 and passes through grooves in the outer end faces of weights 358 of assemblies 350–353 and 400–403 to retain weights 358 in place on spreader head 334. Springs 394 bias weights 358 of assemblies 350–353 and 400–403 snugly against cable 406.

As best shown in FIG. 16, the adjacent free ends of cable 406 extend through apertures in a rigid, U-shaped bracket 408 and are looped snugly around legs of a U-shaped retention clip 410. The legs of clip 410 slidably extend through the U-shaped opening of bracket 408 and are resiliently biased toward each other by snug bearing engagement with opposed wall surfaces on bracket 408 to releasably retain cable 406 tensioned and in place in encircling relation to spreader head 334. Bracket 408 is fixed by bolts 411 to spreader head 334.

Referring now to FIGS. 17 and 19, a suitable, conventional gas generating unit 414 is provided for ejecting weights 358 outwardly and is shown in FIG. 19 to comprise a cartridge and primer cap assembly 420 mounted in a counterbored recess 422 formed in plate section 342. A firing mechanism 424 for detonating cartridge assembly 420 may be similar to firing mechanism 220 and is shown to comprise a firing pin 426 and disconnect pin 428 having notched, interlocking ends. Pins 426 and 428 are coaxially, slidably received in a stepped bore 430 which is formed in an extension housing 432. Housing 432 is suitably fixed to plate section 342. A coiled spring 434 surrounding a reduced diametered section of firing pin 426 reacts against an internal shoulder 436 to bias pin 426 forwardly to a position for firing cartridge assembly 420.

With continued reference to FIG. 19, disconnect pin 428 has an enlarged end section 438 which is received in an enlarged section 440 of bore 430. End section 438 is biased by spring 434 into seating engagement against an annular shoulder 442 formed at the inner end of bore section 440 to retain firing pin 426 against inward displacement.

Still referring to FIG. 19, disconnect pin 428 is connected by a lanyard 444 to one or more of the suspension lines 38 of parachute 26. When suspension lines 38 are nearly stretched to their full lengths by launching and igniting rocket 90, the tension applied by lanyard 444 pulls disconnect pin 428 rearwardly to displace the interlocked ends of pins 426 and 428 into bore section 440 and to thereby compress spring 434. The diameter of bore section 440 is sufficiently large to allow disconnect pin 428 to separate from firing pin 426. As a result, firing pin 426 is biased inwardly by spring 434 to detonate cartridge assembly 420.

Preferably, a second unshown firing mechanism and primer assembly is arranged to ignite cartridge assembly 420.

As shown in FIG. 17, the expanding gases generated by detonating cartridge assembly 420 enter a passage 456 which is in fluid communication with recess 422. Passage 456 extends radially inwardly and intersects with an annular, inwardly opening recess 458 formed in hub 332. Recess 458 is delimited by collar 330 to define an annular chamber 460 into which the expanding gases flow.

As shown in FIGS. 12 and 17, hub 332 is formed with at least one inwardly opening symmetrically-located, longitudinal groove 462 which establishes fluid communication between groove 458 and a further inwardly opening annular groove 464 formed in hub 332. Groove 464 is axially spaced from groove 462 and is delimited by collar 330 to define an annular chamber 466. The expanding gases entering chamber 460 flow through groove 462 and into chamber 466.

As shown in FIG. 12, diametrically opposed passages 468 and 470 respectively formed in plate sections 450 and 452 establish fluid communication between chamber 466 and bores 344–347 in plate sections 340 and 342. Thus, the expanding gases flowing through chamber 466 pass through passages 468 and 470 and are uniformly distributed in bores 344–347 in plate sections 340 and 342 to effect radial displacement of weights 358. By ejecting weights 358 outwardly from spreader head 334, canopy 39 is quickly spread along its periphery to permit air to rush in through the open canopy bottom for inflating parachute 26. The arrangement of fluid flow passages in spreader head 334 provides for an exceptionally uniform distribution of the expanding gases with the result that the spreading energy applied by ejecting weights 358 is uniformly distributed around canopy 39.

Groove seated O-rings 471 and 472 seated in hub 332 axially on opposite sides of grooves 458 and 464 cooperate with O-rings 388 to prevent objectionable escape of weight ejecting gases from spreader head 334. Thus, the spreader header assembly of this invention in addition to applying uniform canopy spreading force and providing for a comparatively slim parachute pack also prevents the expanding gases resulting from igniting cartridge assembly 420 from escaping from spreader head 334 with the result that the objectionable condition of contacting the canopy or the person being recovered with hot, weight-ejecting gases is avoided. Confinement of the weight-ejecting gases in accordance with this invention also assures that uniform pressure is applied to all of the weights 358 even though one or more of the pistons 376 are displaced prematurely.

In accordance with this invention, a lanyard 473 (see FIG. 16) connects suspension lines 38 to clip 410 to pull clip 410 out of bracket 408, thereby releasing cable 406 when lines 38 reach substantially full stretch. Thus, in the event spreader assembly 92 malfunctions, lines 38, upon reaching full stretch, releases cable 406 to allow weights 358 forced away from spreader head 334 by springs 394 with the result that canopy 39 is freed to be inflated aerodynamically as shown in FIG. 11J.

A modified rocket-extracted parachute assembly 480 illustrated in FIG. 20 is especially adapted for recovering heavy cargo whereas the parachute assembly shown in FIGS. 1–19 is used especially for providing the recovery of a man. With the principal exceptions of the bag and spreader head, parachute assembly 480 is similar to the parachute assembly of FIGS. 1–19. Accordingly, like reference numerals have been used to identify similar parts.

As shown in FIG. 20, a larger canopy 482 is used in place of canopy 39 and the bag in which canopy 482 together with its suspension lines 483 are stowed is formed in four sections 484, 485, 486, and 487 to form a cylindrical envelope. Sections 484-487 are detachably secured together in the same manner as described with respect to bag sections 28 and 30 in the embodiment of FIGS. 1–19.

With reference to FIGS. 20 and 21 a series of canopy spreader rockets 490 are provided in a canopy spreader head assembly 492 in place of weight assemblies 350–353 and 400–403. Spreader head assembly 492 comprises a rigid spreader head housing 494 which is fixed to launching tube 110 in the manner previously described in the embodiment of FIGS. 1–19 and which may be essentially circular in cross section. Rockets 490 are mounted on spreader head housing 494 along angularly spaced apart longitudinal axes intersecting the longitudinal axis of launching tube 110.

As shown in FIGS. 21 and 21A, rockets 490 in certain respects are similar to rocket 90 shown in FIG. 6. To the extent that rockets 490 and 90 are the same, like reference numerals have been used to designate like parts except that the reference numerals identifying the parts of rockets 490 are suffixed by the letter "a". As shown in FIG. 21A, each rocket 490 is slidably, coaxially mounted in a launching tube 496 which extends into a stepped bore 498 coaxially formed in housing 494. Each launching tube 496 is fixed to housing 494 by any suitable means. Since rockets 490 are preferably of the same construction, only one will now be described in detail.

With continued reference to FIG. 21A, a modified, cylindrical extension housing 500 is coaxially fixed to the aft end of casing 94a and has a coaxial, rearwardly opening tapped bore 502. A mounting bolt 504 threaded into bore 502 extends coaxially rearwardly beyond housing 500 and mounts a bearing retainer sleeve 506.

A bearing comprising a bushing 508 carried by sleeve 506 rotatably mounts an annular swivel fitting 510.

Still referring to FIG. 21A, a thrust bearing 512 spaced axially rearwardly from bearing 508 is mounted on sleeve 506 and is axially retained between a radial flange 514 formed integral with the rearward end of sleeve 506 and the bottom wall of a rearwardly opening counter bored recess 516 formed coaxially in fitting 510. With this construction, swivel fitting 510 is axially retained between the rearwardly directed end face of housing 500 and flange 514 on sleeve 506.

With continued reference to FIG. 21A, bolt 504 is provided at its rearward end with an enlarged head 518 which is slidably received in an enlarged bored section 520 coaxially formed in sleeve 506. Sleeve 506 is axially slidable on bolt 504 between head 518 and the rearwardly directed end face of housing 500 for a purpose to be described shortly.

As shown in FIG. 21, a pair of tow lines 521 and 522 are respectively secured to pins 523 and 524. Pins 523 and 524 are respectively mounted on bifurcated, diametrically opposed, radially outwardly extending arms 525 and 526. Arms 524 and 526 are formed integral with a mounting collar 528 through which casing 94a slidably and coaxially extends. Tow lines 521 and 522 may be joined together in the form of a bridle which is secured to the periphery of parachute 482.

When rocket 490 is stored in launching tube 496, collar 528 is detachably secured to the upper end of rocket 490 by a specially constructed, threaded pin 530 having a small shearable cylindrical post 531 extending into a blind, radial bore formed in nose cap housing 100a. Collar 528 may also be detachably secured to launching tube 496 by threaded pins 533 which preferably are of the same construction as pin 530. When rocket 490 is launched from tube 496, it moves outwardly through collar 528 for a purpose to be described shortly.

As shown in FIGS. 21A and 22, the diameter of swivel fitting 510 is slightly greater than the diameters of housing 500 and casing 94a to provide an axially facing marginal surface 534 on which collar 528 seats when rocket 490 is launched. The outer diameters of casing 94a and housing 500 are preferably the same to provide a continuous cylindrical surface along which collar 528 slides when pulled rearwardly from its stored position adjacent the forward end of rocket 490.

With continued reference to FIG. 21A, the rearward end of firing pin 224a of firing mechanism 220a is provided in this embodiment with a knuckle 544 which is coaxially received in a spring tang lock 548 having a tubular section which is slotted to form fingers 549 which securely grip knuckle 544 to retain firing pin 224a in its rearwardly retracted position against the bias of spring 232a. Lock 548 extends rearwardly and coaxially through a stepped bore 554 formed in swivel fitting 510 and at its rearward end terminates in an enlarged cylindrical section 556. Section 556 seats against a rearwardly directed shoulder formed in bore 554 to axially retain swivel fitting 510 in abutment with the rearwardly directed end face of housing 500 when rocket 490 is stored in launching tube 496.

A second firing mechanism (not shown) of the same construction as mechanism 220a is also mounted in housing 500 and is simultaneously actuatable with mechanism 220a to effect ignition of charge 242a in a manner to be described shortly.

When rocket 490 is launched from tube 496, collar 528 is shifted to its aft seating position on fitting 510 so that the tension applied through two lines 521 and 522 displaces swivel fitting 510 and sleeve 506 axially rearwardly to the position shown in FIG. 22 where a rearwardly facing internal, annular shoulder 558 formed on sleeve 506 abuts head 518 of bolt 504. As a result of this motion, lock 548 and firing pin 224a are pulled axially rearwardly with swivel fitting 510 to compress spring 232a. When the ends of fingers 549 clear the rearward edge of bore 538, knuckle 544 is released with the result that firing pin 224a separates from lock 548, permitting spring 232a to urge pin 224a forwardly to fire detonator 234a. By firing detonator 234a, charge 242a is detonated to ignite the main body of rocket propellant 97a in the manner described in the previous embodiment.

Spreader head assembly 492 also includes cartridge assemblies 420 and 452 and their respective firing mechanisms 424 and 450 are mounted on housing 494 in the manner described in the previous embodiment. When suspension lines 38 are payed out to substantially their full length in cartridge assemblies 420 and 452 are fired, and the expanding gases resulting from the explosion flow through passages (not shown) which are formed in spreader head housing 494 similar to those already described in the spreader housing shown in the embodiment of FIGS. 1–19. These expanding gases flow into stepped bore sections 570 formed in bores 498 receiving their respective rockets 490. Each bore section 570 defines a pressure chamber 572.

As shown in FIG. 21A, extension housing 500 is slidably and coaxially received in a forwardly opening bore 573 formed in a launching piston 574. Piston 574 is slidably and coaxially received in launching tube 496 which delimits chamber 572. The expanding gases flowing into chamber 572 propel piston 574 and rocket 490 radially outwardly toward the forward end of launching tube 496. As rocket 490 moves out of launching tube 496, pin 530 is sheared, leaving collar 528 secured to tube 496 by pins 533. Rocket 490 slides through collar 528 until piston 574 reaches the forward end of launching tube 496 where it strikes collar 528 with sufficient impact to shear pins 533. As a result, collar 528 is freed from launching tube 496 and moves away from launching tube 496 at the same velocity as rocket 490. A flange 575 fixed at the outer end of launching tube 496 is abutted by piston 574 as it moves to the outer end of tube 496. Flange 575 prevents piston 574 from being launched out of tube 496 to retain the cartridge launching gases in tube 496 and to allow rocket 490 to separate from piston 474. Confinement of gases in tube 496 prevents possible contact with the parachute canopy.

Rocket 490, still unignited, moves out of launching tube 496 to pull tow lines 521 and 522 taut. The initial tension applied through lines 521 and 522 pulls on collar 528 to slide it to the aft end of housing 500 where it shoulders on fitting 510, displacing it rearwardly to the position shown in FIG. 22. By displacing fitting 510 to its rearward position spaced from housing 500, lock 548 is pulled from bore 538 permitting firing pin 224a to be urged forwardly under the bias of spring 232a to fire detonator 234a. As a result, charge 242a is fired to ignite the rocket propellant 97a. By igniting the rocket propellant 97a in each of the rockets, rockets 490 move away under their own power to spread canopy 482.

Preferably, tow lines 521 and 522 are automatically cut after canopy 482 has been spread to free each of the rockets 490 from canopy 482 and thereby eliminate the hazard of having hardware to cause damage to the cargo in addition to eliminating the dead weight of rockets 490 after the main body of propellant in each rocket burns out.

To cut lines 521 and 522, collar 528, as shown in FIG. 21, is formed with an inwardly opening annular recess 582 and passages 588 and 590 which open into recess 582. Passages 588 and 590 extend substantially radially outwardly in arms 525 and 526 respectively and open into the bores receiving pins 523 and 524. Sheath contained mild detonating fuses generally indicated at 592 are received in recess 582 and passages 588 and 590 are connected to linear shaped charges indicated at 593. Charges 593 bear against the ends of lines 521 and 522 in arms 525 and 526 and are detonatable to cut lines 521 and 522 for freeing rocket 490 from canopy 482.

When swivel fitting 510 is shifted rearwardly to its position shown in FIG. 22 by relative movement between rocket 490 and collar 528, recess 582 radially aligns with a radial bore 594 communicating with the rearward end of a bore 596 which is formed in housing 500 along an axis extending parallel to but radially offset from the longitudinal axis of rocket 490. Slidably mounted in bore 596 is a piston 598 which is shown to be disposed between the intersection of bore 594 and a forwardly opening, metal well 600. Well 600 is formed with an apertured bottom 602 and contains a suitable charge 604 of rocket propellant.

Charge 242a in addition to igniting the main body of rocket propellant 97a also ignites charge 604 in well 600. Charge 604 is sized to burn out just prior to burn out of propellant 97a to expose the apertured bottom 602 to combustion chamber 96a. As a result, the gases generated by burning propellant 97a are then free to pass through the apertured bottom of well 600 to urge piston 598 rearwardly. Mounted on piston 598 is a firing pin 606 which fires a detonator 608 when piston 598 is urged rearwardly by the expanding gases passing through the apertured bottom of well 600. Firing of detonator 608 detonates fuse 609 which in turn detonates fuses 592. Fuses 592 detonate almost instantly to detonate charges 593.

Another embodiment of a rocket extraction and spreading apparatus generally indicated by the reference numeral 619 for deploying and opening a parachute is illustrated in FIGS. 23–39. To the extent that the embodiments of FIGS. 1–19, 20–22, and 23–39 are alike, like reference numerals have been used to identify like parts.

As shown in FIG. 23, apparatus 619 is mounted on a rigid, curved adaptor plate 620 to which harness fittings 622 and 624 are secured by nut and bolt assemblies 626 and 628 respectively. Harness 50, which may be a standard navy torso restraint garment, is looped through harness fittings 622 and 624 and through slots 625 to securely strap adaptor plate 620 to the wearer's lower back and hips.

As best shown in FIGS. 24 and 25, a short, rigid rod member 630 is suitably fixed to plate 620 and extends upwardly and rearwardly in close alignment with the man's spine. Rod member 630 terminates at its upper end in a spherical knob 632 which is slidably received in a downwardly opening socket 634 formed in a rocket igniter mechanism housing 636.

Housing 636 is supportingly seated on knob 632 and, as best shown in FIG. 26, is formed with an internally threaded tubular section 638 which is open at both ends. The lower end of launching tube 110 is securely, coaxially threaded into the upper end of section 638. Launching tube 110 and rocket 90 received in tube 110 are thus firmly supported on adaptor plate 620 by cooperative bearing engagement of knob 632 with the inner end of socket 634.

To releasably retain knob 632 in socket 634, a pair of small balls 640 and 642, as shown in FIG. 25 bear against the downwardly facing surface of knob 632 in socket 634 and are respectively secured to adjacent, related free ends of a pair of tough, flexible cables 644 and 646. Cables 644 and 646 respectively extend in opposite directions through open-ended bores passages 648 and 650 intersecting socket 634. Passages 648 and 650 are formed in housing 636 along inclined axes that are spaced from and extend transversely of the longitudinal axis of tubular section 638.

As shown in FIG. 23, the portions of cables 644 and 646 extending beyond passages 648 and 650 respectively pass freely through guide tubes 652 and 654 fixed to adaptor plate 620 on opposite sides of housing 636. The ends of cables 644 and 646 extending beyond tubes 652 and 654 are respectively secured to the lower bridle lines 78 and 89 of stabilizing parachute 24 by suitable fittings generally indicated at 656. As will be described in detail shortly, the tension applied by deploying parachute 24, is adapted to urge cables 644 and 646 outwardly to displace balls 640 and 642 from their locking positions illustrated in FIG. 25. Passages 648 and 650 are made sufficiently large in diameter that balls 640 and 642 may be pulled through passages 648 and 650 in housing 636. By releasing knob 632 from housing 636, launching tube 110 and the parts secured thereto are freed for separation from plate 620 and harness 50.

To releasably retain balls 640 and 642 in their locking positions for retaining knob 632 locked in socket 634, a pair of retaining balls 658 and 660, as shown in FIG. 27, are seated in separate sockets 661 and 662 formed at adjacent ends of bore passages 663 and 664. Passages 663 and 664 are formed in housing 636 and respectively intersect with passages 648 and 650 at equal, small acute angles. Passages 663 and 664 are slightly inclined downwardly and extend outwardly in opposite directions with their inner ends opening into passages 648 and 650 for a purpose to be explained later on.

With continued reference to FIG. 27, the inner, adjacent ends of passages 663 and 664 intersect a smooth walled bore section 666 defined by housing section 638 such that passages 663 and 664 open into the interior of tubular section 638 substantially diametrically opposite from their respective openings into passages 648 and 650. The diameters of balls 658 and 660 are sufficiently larger than sockets 661 and 662 that they will partially protrude either into bore section 666 or into passages 648 and 650 respectively. Housing 636 and the parts thus far described which are assembled in housing 636 are symmetrically arranged about a plane passing through the longitudinal axes of housing section 638 and socket 634.

In the positions of parts shown in FIG. 27, balls 658 and 660 partially block passages 648 and 650 behind balls 640 and 642 and cooperate with pins or cylindrical members 722 and 724 and a cylindrical cartridge casing 668 to prevent cables 644 and 646 from being pulled through passages 648 and 650 in a manner to be described shortly. Cartridge casing 668 (see FIGS. 27–30) is slidably, coaxially received in bore section 666 and, as best shown in FIGS. 28 and 31, is formed with a pair of thin, outwardly facing, straight flats 670 and 672. Flats 670 and 672 extend transversely of the longitudinal axis of bore section 666 and are contained in vertical planes intersecting each other at an obtuse angle.

Flats 670 and 672 are disposed adjacent the lower end of casing 668 and cooperate with pins 722 and 724 to respectively urge balls 658 and 660 into their illustrated passage blocking positions for preventing withdrawal of cables 644 and 646.

With continued reference to FIGS. 27–30, casing 668 is formed with an open top and a flat bottom wall 674 to define an ignition chamber 676 (FIG. 27). Seated in upwardly opening blind bores formed in bottom wall 674 are a pair of conventional primer cartridge assemblies 678 and 680 which are ignitable in a manner to be described later on to generate gases for urging piston 162 upwardly to launch rocket 90.

Casing 668, as best shown in FIGS. 24, 28, and 29, is releasably fixed in housing 636 by a plurality of locking balls 681 which are partially received in equiangularly spaced apart, radial through bores 682 formed in casing 668 near the upper end thereof. In the positions of parts shown in the drawings, the portions of balls 681 protruding outwardly beyond bores 680 interfittingly seat in an inwardly opening annular recess 683 (see FIGS. 24 and 26) formed in housing 636 near the upper end thereof to releasably lock casing 668 in place within housing section 638.

To retain balls 681 in their illustrated locking positions, piston 162 is integrally formed with an annular skirt 684 which interfittingly seats in an upwardly opening, annular groove 686 formed in the upper end of casing 668. Skirt 684, as best shown in FIG. 24, bears against the inwardly facing peripheral surfaces of balls 681 to thus retain them seated in recess 683.

When balls 681 are seated in recess 683 to lock casing 668 in housing 636, flats 670 and 672 bear against balls 658 and 660 to prevent withdrawal of cables 644 and 646, and separation of housing 636 and launching tube 110 from adaptor plate 620. When cartridge assemblies 678 and 680 are ignited, the expanding gases displace piston 162 upwardly as described in the previous embodiments with the result that skirt 684 is disengaged from balls 681, allowing the expanding gases in chamber 676 to urge casing 668 downwardly to displace flats 670 and 672 below balls 658 and 660.

An O-ring 687 (FIG. 24) seated in an outwardly opening annular groove formed in the periphery of casing 668 below balls 681 provides a fluid tight seal with the periphery of bore section 666 to prevent escape of gases.

Above flats 670 and 672, casing 668, as shown in FIGS. 24, 29 and 30, is formed with radially opening recesses 692 and 694 which respectively align with balls 658 and 660 when casing 668 is urged downwardly by the expanding gases in chamber 676. The tension applied by deploying stabilizing parachute 24 forces balls 640 and 642 against balls 658 and 660 respectively with the result that balls 658 and 660 are pushed out of passages 648 and 650 and partially into the clearance provided by recesses 692 and 694 when casing 668 is displaced downwardly by expanding gases in chamber 676. With passages 648 and 650 unblocked, the tension applied by deploying stabilizing parachute 24 pulls cables 644 and 646 through passages 648 and 650 to free lower bridle lines 78 and 80. In addition, igniter housing 636 is unlatched from adaptor plate 620 to allow pack 20 to be deployed away from the man by launching rocket 90.

If it is desired to effect an over-the-side bailout or if a malfunction occurs the present invention provides for a manually operated backup for unlatching pack 20 and releasing bridle lines 78 and 80. This manual backup comprises a D-ring 696 (see FIGS. 23 and 31) which is connected by a suitable cable and fitting assembly 698 to a shaft 700. Shaft 700, as best shown in FIGS. 31 and 33, is formed with diametrically enlarged, cylindrical end sections 702 and 704 which are rotatably received in aligned through bores 706 and 708 respectively formed in parallel, spaced apart ears 710 and 712. Ears 710 and 712 depend from and are formed integral with housing 636.

As best shown in FIG. 32, balls 714 and 716, respectively received in short radial passages 718 and 720 engage the peripheries of shaft sections 702 and 704. Passage 718 radially intersects bore 706 and passage 663. Similarly, passage 720 radially intersects bore 708 and passage 664.

When balls 714 and 716 engage the cylindrical peripheries of sections 701 and 704, they project partially into passages 663 and 664 to block axial movement of cylindrical members 722 and 724. Member 722 is axially slidable in passage 663 between ball 658 and ball 714. Similarly, member 724 is axially slidable in passage 664 between ball 660 and ball 716.

When ball 714 engages the periphery of shaft section 702 to block axial displacement of member 722, ball 658 is retained in socket 661 in abutment with member 722 to prevent withdrawal of cable 644. Similarly, engagement of ball 716 with the periphery of shaft section 704, blocks axial displacement of member 724 to retain ball 660 in socket 662 for preventing withdrawal of cable 646.

To unlatch pack 20 for deployment and to release the lower bridle lines 78 and 80 manually, D-ring 696 is pulled to turn shaft 700 to a position where radially outwardly opening pockets 726 formed in shaft sections 702 and 704 align with passages 718 and 720. When tension is now applied to cables 644 and 646 formed in shaft sections 702 and 704 by deploying stabilizing parachute 24, balls 640 and 642 are pushed against balls 658 and 660 to forcibly urge members 722 and 724 against balls 714 and 716. Members 722 and 724, as best shown in FIG. 32, are each provided with camming surfaces 730 which engage and push balls 722 and 724 out of passages 663 and 664 and into pockets 726. Displacement of balls 722 and 724 into pockets 726 unblocks passages 663 and 664 to allow sufficient displacement of balls 658 and 660 for releasing cables 644 and 646. Accordingly, bridle lines 78 and 80 are released and the parachute pack containing recovery parachute 26, launching tube 110 and igniter housing 636 is freed from adaptor plate 620. When rocket 90 is now ignited by pulling tow line 173 taut, the parachute pack will be deployed away from the man or cargo to be recovered to pay out suspension lines 38.

Referring now to FIGS. 24, 34, and 35, a firing mechanism 732 for detonating cartridge assemblies 678 and 680 comprises a housing 734 mounted on the rearward side of igniter housing 636. Housings 734 and 636 are formed with interengaging notches 735 (see FIGS. 26 and 35) to retain housing 734 against axial displacement relative to housing 636. As best shown in FIG. 31, parallel ears 736 and 738 formed integral with housing 734 extend between ears 710 and 712 and are formed with aligned through bores 740 and 742 which rotatably receive shaft sections 702 and 704. Engagement of notches 735 prevents rotation of housing 734 about the axis of shaft 700 to thus securely fix housing 734 to housing 636.

With continued reference to FIGS. 24 and 34, firing pin assemblies 744 and 746 mounted in housing 734 are actuatable to respectively detonate cartridge assemblies 678 and 680. Assembly 744 comprises a firing pin 748 mounted on a hammer arm 750 which is swingably supported by a small, cylindrical pin 751 in a cavity 752 formed in housing 734. The axis of pin 751 is contained in a plane extending at right angles to the longitudinal axis of igniter housing 636 so that as viewed from FIG. 24, firing pin 748 is swingable in a vertical plane below bottom wall 674 of casing 668.

As best shown in FIG. 34, arm 750 is disposed between an internal wall surface 754 of housing 734 and a flat-sided support plate 756 which is fixed to housing 734 and which divides cavity 752 into side-by-side compartments respectively receiving firing pin assemblies 744 and 746. By rotating arm 750 counterclockwise as viewed from FIG. 24, firing pin 748 is swung upwardly through a small bore 758 (see FIG. 30) formed in bottom wall 674 of casing 668 to ignite cartridge assembly 678.

With continued reference to FIG. 24, the end of arm 750 opposite from firing pin 748 is secured by a flexible chain 760 to the lower free end of a cantilever spring assembly 762 comprising a series of overlapping spring leafs. The upper end of spring assembly 762 is suitably fixed to a U-shaped bracket 764 which is pivotally mounted by a pin 765 in the upper end of housing 734. The parts of assembly 744 shown in full lines represent the cocked position preparatory to firing, and the fragmentary phantom lines represent the triggered position.

Assembly 746 preferably is of the same construction as assembly 744. Accordingly, like reference characters have been used to identify like parts except that the numerals identifying the parts of assembly 746 are suffixed with the letter "a". As shown, assemblies 744 and 746 are disposed in side-by-side relation in housing 734. Firing pin 748a is swingable upwardly through a small hole 766 (see FIG. 30) in bottom wall 674 of cartridge casing 668 to ignite cartridge assembly 680.

Spring assembly 762a also is fixed at its upper end to bracket 764 and cooperates with spring 762 to apply a biasing force tending to urge bracket 764 in a counterclockwise direction (as viewed from FIG. 24) about the axis of pin 765. Bracket 764, as best shown in FIGS. 24 and 34, is formed with a pair of depending arms 768 and 769 extending downwardly in recess 752 along oppositely facing side edges of spring assemblies 762 and 762a. When housing 734 is assembled in place or igniter housing 636, arms 768 and 769 are engaged by the periphery of housing 636 to swing bracket 764 in a clockwise direction as viewed from FIG. 25 to cock or flex springs 762 and 762a.

Hammer arm 750 is retained in its cocked position shown in the drawings by an assembly comprising a U-shaped safety pin 770, a U-shaped lock 771, and a latch 772. Hammer arm 750 extends between the arms of lock 771 which is rockably mounted on pin 751. safety pin 770 is formed with a straight leg 773 slidably extending through aligning apertures in housing 734, the arms of lock 771 and plate 756. The portion of leg 773 bridging the arms of lock 771 extends through a rearwardly opening slot formed in hammer arm 750. Latch 772 is mounted by a pin 774 for rocking movement about an axis extending parallel to the axis of pin 751. Latch 772 is kept from rotating in a clockwise direction (as viewed from FIG. 24) by abutment with the arms of lock 771. Hammer arm 750, in turn, is kept from rotating in a counterclockwise direction by abutting engagement with a step 775 formed on latch 772. By removing safety pin 770, hammer arm 750 is free to rotate counterclockwise under the bias exerted by spring assembly 762.

The assembly for retaining hammer arm 750a in its illustrated, cocked position comprises a safety pin 776, a lock 771a, and a latch 772a. The arrangement, construction, and mounting of latch 772a and lock 771a is the same as that just described for latch 772 and lock 771. Safety pin 776 is formed with a straight leg portion 778 which slidably extends through aligned apertures in housing 734, lock 771a, arm 750a and plate 756. Removal of pins 770 and 776 is accomplished in a manner to be described later on allows the bias exerted by spring assemblies 762 and 762a to respectively swing firing pins 748 and 748a to their cartridge detonating positions.

As shown in FIGS. 24, 31, and 37, the present invention provides for a safety locking mechanism 780 to prevent the rocket-launching firing mechanism 732 from firing cartridge assemblies 678 and 680 until the man wearing the parachute assembly of this invention separates from his seat in an aircraft or other form of vehicle. Locking mechanism 780 comprises a spherical knob 782 formed at the upper end of a rod section 784. Rod section 784 is rigidly secured to a section 786 of a seat indicated at 787 and occupied by the man wearing the apparatus of this invention. Knob 782 extends into a downwardly opening bore 788 and seats in a socket 789 at the inner end of bore 788. Bore 788 is formed in housing 734 along an axis contained in a plane passing through the longitudinal axis of igniter housing 636. As shown, bore 788 is parallel with the longitudinal axes of housing 636 and socket 634 and is diametrically opposite socket 634.

As best shown in FIG. 31, knob 782 is releasably locked in its illustrated socket-seated position by a latch 792. Latch 792 is pivotally mounted on housing 734 by a pin 794 for swinging movement about an axis extending at right angles to and laterally offset from the longitudinal axis of bore 788. A spring 796 biases latch 792 into bearing engagement with the underside of knob 782 to releasably secure housing 734 to seat 786. Thus it will be appreciated that pack 20, which is secured to the man, is locked to seat 786 when the parts of locking mechanism 780 are in the positions illustrated in the drawings.

The seat construction to which this invention is particularly applicable is of the displaceable type in which the entire seat or the seat back moves upwardly at least by a limited distance during the escape sequence of the man from the aircraft or other form of vehicle in which he is disposed. Such seats are disclosed in U.S. Pat. application Ser. No. 390,709 filed on Aug. 19, 1964 by Robert M. Stanley and Eric Griffith for "Occupant Escape Apparatus For Aircrafts Or The Like". Since details of such seats do not constitute a part of this invention, however, they will not be described herein in detail.

In this embodiment, a suitable fluid pressure operated actuator 797 is operatively connected to displace seat 787 upwardly along a pair of guide rails 798 (one shown in FIG. 37) disposed on opposite sides of seat 787 and suitably fixed to the frame of the seat-receiving vehicle.

Referring now to FIG. 38, release of pack 20 from seat 787 is effected by a tripping member 800 which is fixed to one of the guide rails 798 or some other fixed part in the vehicle and which engages a lever 802 when seat section 786 is displaced upwardly by a predetermined distance from its position shown in FIG. 37. Lever 802 is pivotally mounted by a pin 804 on seat section 786 and is rotated in a counterclockwise direction by engagement with tripping member 800. A rigid link 806 pivotally connected at one end to lever 802 by a pin 808 is pulled to the left by counterclockwise rotation of lever 802. At its other end, link 806 is pivotally connected by a pin 809 to a lever 810. Lever 810 is pivotally mounted on seat section 786 by a pin 811 and is rotated in counterclockwise direction about the axis of pin 811 when lever 800 is pivoted to pull link 806.

With continued reference to FIGS. 31 and 38, a plunger 812 is pivotally connected at its lower end to lever 810 by a pin 813 and extends upwardly through a compartment slot 814 to a position vertically below latch 792. The counterclockwise motion imparted to lever 810 as a result of swinging lever 802 in a counterclockwise direction displaces plunger 812 upwardly to engage the downwardly facing edge of a lateral projection 815 which forms an integral part of latch 792. By raising plunger 812 to engage projection 815, latch 792 is swung out of engagement with knob 782, thereby releasing pack 20 for separation from seat 787.

As shown in FIG. 38, a pair of rigid links 816 and 817 are pivotally connected at adjacent ends to lever 810 by pins 818 and 819 respectively. Links 816 and 817 extend laterally toward opposite sides of seat 787 and are respectively connected to pin members 820 and 821. Pin members 820 and 821 are releasably connected in disconnect fittings 822 and 823 which are secured to opposite ends of a seat belt 824 (see FIG. 37). When lever 810 is rotated in a counterclockwise direction to raise plunger 812 for engagement with latch 792, links 816 and 817 are pulled toward each other to withdraw pin members 820 and 821 from fittings 822 and 824 for relasing seat belt 824. A cable 825 secured to lever 802 is connected to a disconnect fitting 826 to release the man's shoulder harness indicated at 827 when lever 802 is rotated in a counterclockwise direction by engagement with tripping member 800. As a result, the man and pack 20 are simultaneously released for separation from seat 787.

For ditching, a cable 828, as shown in FIGS. 37 and 38, is connected at opposite ends to a hand lever 829 (FIG. 37) and to lever 810 (FIG. 38). By pulling lever 829, lever 810 is rotated in a counterclockwise direction to raise plunger 812 for unlatching pack 20 from seat 787 and for relasing seat belt 824 in the manner previously explained. In addition, the counterclockwise movement of lever 810 is transmitted through link 806 to swing lever 802 in a counterclockwise direction with the result that cable 825 is pulled to release shoulder harness 827.

To arm the rocket launching, ballistic firing mechanism 732 when the man separates from his seat in the aircraft or the like, a latch 830, as shown in FIG. 31, is pivotally mounted in housing 734 by a pin 831. The axis of pin 831 extends parallel to the axis of pin 794. Latch 830 is formed with a pair of mutually perpendicular arms 832 and 833 which respectively extend generally transversely and longitudinally with respect to bore 788. Arm 832 is slidably extends through a slot 834 formed in housing 734 between bore 788 and cavity 752 containing spring assemblies 762 and 762a. A spring 835 biases arm 832 downwardly into engagement with the upwardly facing peripheral surface of knob 782 in socket 789. Knob 782, when seated in socket 789, bears against arm 832 to hold arm 832 in a position where its upper edge protrudes into recess 752 rearwardly of the lower free ends of spring assemblies 762 and 762a to block flexing movement of spring assemblies 762 and 762a to positions for firing cartridge assemblies 678 and 680.

When housing 734 separates from knob 782, spring 835 urges latch 830 in a counterclockwise direction as viewed from FIG. 31 to rock arm 832 downwardly and out of the path of the lower, free ends of spring assemblies 762 and 762a. Thus, when safety pins 770 and 776 are removed, spring assemblies 762 and 762a are then free to bias firing pins 748 and 748a to their cartridge igniting positions.

With continued reference to FIG. 31, a ball and detent assembly 836 having cooperating elements 837 and 838 on arm 832 and housing 734 respectively releasably locks latch 830 in an arming position when arm 832 is swung downwardly out of the flexure path of spring assemblies 762 and 762a. This prevents inadvertent displacement of latch 830 to block flexing movement of spring assemblies 762 and 762a after housing 734 is lifted upwardly from knob 782 to separate the parachute assembly from seat 787.

In accordance with this invention, safety pin 770 is removed by arming an aneroid or barometric timer 840 shown in FIG. 39. Timer 840 may be of any suitable, conventional form such as, for example, the Model 1000-D manufactured by the Master Specialties Company.

With continued reference to FIG. 39, timer 840 is operatively connected by a timer arming lanyard 841 (see also FIG. 34) to a seat mounted release member 841a. Timer 840 thus is armed by relative movement of the parachute assembly to the seat. Arming of timer 840 detonates a time delay cartridge 842 which is received in a bored chamber 843 formed in the timer housing 844. Preferably, the time delay for detonating cartridge is set at 2 seconds to allow sufficient time for the man to be ejected or extracted from the aircraft.

With continued reference to FIG. 39, the expanding gases generated by detonating cartridge 842 pass through aligned passages 845 and 846 respectively formed in housing 844 and a fluid motor cylinder 847. cylinder 847 is essentially tubular in shape and has a smooth internal bore 848 which slidably and coaxially receives a sleeve-shaped piston 849. Piston 849 defines a cylindrically walled bore 850 which opens into the interior of cylinder 847.

With continuing reference to FIG. 39, piston 849 is formed with a diametrically enlarged intermediate section 851 slidably engaging the interior wall surface of housing 834 and having an axially facing annular shoulder 852 cooperating with cylinder 847 to delimit an annular fluid pressure chamber 853. Passage 846 radially communicates with chamber 853 for conveying the expanding gases from timer 840. The related axially opposed areas of piston shoulder 852 and the interior of cylinder 847 delimiting chamber 853 are such that a differential pressure is applied to urge piston 849 to the left as viewed from FIG. 39. Groove-seated o-rings 854 and 855 respectively carried by piston section 851 and cylinder 847 axially on opposite sides of chamber 853 prevent escape of gases from the chamber. Axially spaced apart O-rings 856 and 857 seated in inwardly opening annular grooves formed in a housing section 858 on opposite sides of passages 845 and 846 prevent escape of expanding gases being conveyed from timer 820 to cylinder 847.

Still referring to FIG. 39, piston section 851 forms an annular shoulder 859 which faces axially in a direction opposite from shoulder 852 and which is engageable with the annular end face of a collar 860. Collar 860 is coaxially and slidably received in cylinder 947 and is integrally formed with a radial ear 862 extending through a slot 864 in cylinder 847. The end of ear 862 projecting beyond cylinder 847 is connected by a link 866 to safety pin 770. The inside diameter of collar 860 is such that it axially slidably receives the left-hand, reduced diametered end of piston 849 as it is shifted axially to the left by introduction of expanding gases into chamber 853.

Abutting engagement of shoulder 859 with the right-hand annular end face of collar 860 displaces collar 860 to the left to thereby pull pin 770 out of firing mechanism 732. Firing mechanism 732 is then actuated to detonate cartridge 678 which has a two second time delay for a purpose to be described shortly. Detonation of cartridge 678 launches rocket 90 as previously explained.

With continuing reference to FIG. 39, a cable 868 which is connected to a pin 869 extends through a small bore formed in an end wall of piston 849 and mounts a ball 870 which seats against an annular, inwardly facing shoulder surface 871. Pin 869 is mounted in a locking cone 871a for securing flaps 40 in place. By displacing piston 849 to the left as viewed from FIG. 39, cable 868 pulls pin 869 from cone 871a to release stabilizing parachute 24.

With continuing reference to FIG. 39, a safety pin 770 is formed with a further leg 872 which slidably extends through aligned apertures in a yoked portion of a mounting collar 874 and in support plate 756. Collar 874 snugly receives cylinder 847 so that when safety pin 770 is in its disarming position, it supports cylinder 847 along with timer 840 from housing 734. As a result, removal of pin 770 frees cylinder 847 and timer 840 from the parachute pack assembly in addition to arming the firing mechanism for launching rocket 90.

With continued reference to FIG. 39, the firing mechanism for igniting cartridge assembly 680 is manually armed by pulling D-ring 696 which is connected by a flexible cable 880 to a ball 882 which is axially displaceable to the left as viewed from FIG. 39 to engage a pair of transverse pins 884 fixed in a collar 886. Collar 886 is coaxially, slidably received in the left-hand end of cylinder 847 in axially spaced relation to collar 860 and has a projection 888 extending through a longitudinal slot 890 formed in the periphery of cylinder 847. Projection 888 is connected by a suitable motion transmitting cable 892 to safety pin 776 such that when D-ring 696 is pulled, pin 776 is pulled from housing 734 to arm the firing mechanism assembly for igniting cartridge assembly 680. Cartridge assembly 680 is fired with zero delay to launch rocket 90.

With continued reference to FIG. 39, cable 880 extends coaxially through a hole in ball 882 and is secured to a further ball 893 which is slidably received in piston 849. When D-ring 696 is pulled, ball 893 is axially displaced relative to piston 849 to engage a pair of transverse pins 894 which are secured to piston 849. As a result, pulling D-ring 696 axially shifts piston 849 to engage shoulder 859 with collar 860 for pulling out safety pin 770 at the same time safety pin 776 is pulled out. Cartridge assembly 678 thus will fire 2 seconds after firing pin 748a is actuated to fire cartridge assembly 680. In addition to igniting cartridge assemblies 678 and 680, pulling D-ring 696 to displace piston 849 releases pin 869 from cone 871a to release stabilizing parachute 24. Since piston 849 is axially slidable relative to ball 893, activation of timer 840 to displace piston 849 does not arm the firing mechanism for igniting cartridge assembly 680.

The delay in ingiting cartridge assembly 678 allows sufficient time for the man to clear of the vehicle by a powered extraction or ejection before rocket 90 is launched. When making an over-the-side bail-out on the other hand, no time delay is desired for launching rocket 90 after D-ring 696 is pulled. For this reason, cartridge assembly 680 is set at zero delay as previously mentioned.

From the foregoing it will be appreciated that the parachute assembly illustrated in FIGS. 23–39 is safe against any form of ballistic activation while still attached to seat 787. Separation of the parachute assembly from seat 787, according to this invention, arms firing mechanism 732.

At the time of powered seat-man separation, lanyard 841 arms timer 840. After a short delay of preferably 2 seconds, cartridge 842 in timer 840 is ignited to supply gas pressure to cylinder 847 for displacing piston 849. Displacement of piston 849 to the left as viewed from FIG. 39, deploys stabilizing parachute 24 and simultaneously arms firing mechanism 732 for igniting cartridge assembly 678. Cartridge 678 fires after a further two second time delay to launch rocket 90, unlatch pack 20 from adaptor plate 620, and disconnect bridle lines 78 and 80 of stabilizing parachute 24. The motion imparted to rocket 90 disconnects the upper bridle line for stabilizing parachute 24 as previously described. At rocket line stretch, rocket 90 ignites as previously explained to pull pack 20 away from the man unitl it reaches canopy line stretch. At about 80 to 85 percent of line stretch, bag 22 is stripped off in the manner described in the previous embodiments. At about 90 percent of line stretch, the canopy spreading cartridge assemblies are ignited to spread and thereby inflate canopy 39.

To bail out over the side, the man pulls lever 829 to release himself and pack 20 from seat 787. After climbing out, he then activates the recovery system by pulling D-ring 696. Pulling of D-ring 696 by-passes timer 840 and all time delays to deploy stabilizing parachute 24, release pack 20 for deployment relative to the man, disconnect the lower bridle lines 78 and 80 of stabilizing parachute 24, and launch rocket 90. It will be appreciated that seat-parachute separation, whether it be done by powered extraction or ejection or by climbing out over the side to make a manual bail out, deactivates safety locking mechanism 780 to arm the parachute system.

In the event that timer 840 fails to ignite cartridge 842, or in the event cartridge 842 fails to ignite, or, if ignited, remains blocked shut, the man pulls D-ring 696 to effect (1) release of pack 20 from adaptor plate 620, (2) disconnection of lower bridle lines 78 and 80, (3) deployment of stabilizing parachute 24, and (4) launching of rocket 90.

In the envent that timer 840 fails to deploy stabilizing parachute 24 or launch rocket 90, the man pulls D-ring 696 which will deploy parachute 24 and simultaneously launch rocket 90 to discard parachute 24 as previously explained.

In the event that rocket 90 is not launched after the man pulls D-ring 696 and stabilizing parachute 24 opens, stabilizing parachute 24 will pull rocket 90 to line stretch. Rocket 90 will then fire and pull pack 20 to line stretch. If rocket 90 fails to fire, stabilizing parachute 24 will pull pack 20 to line stretch. Even without stabilizing parachute 24, the aerodynamic drag of pack 20 and its self-opening features previously described will deploy parachute 26 in spite of simultaneous failures of the rocket launching cartridges, rocket 90 itself and stabilizing parachute 24.

As shown in FIG. 24, the rocket pusher assembly is modified to the extent that sleeve 166 and piston cap 164 are replaced with a longitudinally split half shell assembly 895 comprising a pair of half shells 896 and 896a. Shells 896 and 896a are seated on piston 162 and form a tubular stowage casing receiving tow line 173. Inwardly bent tabs 897 and 897a respectively fixed to the upper ends of shells 896 and 896a extend through apertures 897 and 897a formed in inwardly bent ears 899 and 899a. Ears 899 and 899a may be fixed to or formed integral with fitting 170 which forms a part of swivel assembly 176.

In the inactive position of parts shown in FIG. 24, ears 899 and 899a seat on tabs 897 and 897a to thus support rocket 90 in launching tube 110. Shells 896 and 896a are thus axially confined between piston 162 and ears 899 and 899a and are prevented from spreading apart by the weight of rocket 90 bearing down on tabs 897 and 897a. The rocket launching force is transmitted through piston 162, half shells 896 and 896a and ears 899 and 899a. When rocket 90 is launched from tube 110, half shells 896 and 896a are released from axial confinement between piston 162 and rocket 90 and have sufficient resiliency to fly radially apart at their upper ends to withdraw tabs 898 and 898a from ears 899 and 899a. As a result, shells 896 and 896a separate from rocket 90 to allow unrestrained uncoiling of tow line 173 as rocket 90 moves away from pack 20.

Referring now to FIGS. 40A–40D a modified rocket deployed parachute assembly is shown to comprise a deployment sleeve 900 containing canopy 39 and stored in a bag 902. Bag 902, in this embodiment, is not deployed when rocket 90 is launched and ignited, but remains strapped to the man by harness 50. Launching tube 110 receiving rocket 90 is stored in bag 902 along with parachute 26 and is secured to sleeve 900 by a flexible tow line 904.

Sleeve 900, as best shown in FIG. 41, is provided with flaps 908 at its lower end adjacent to the skirt of canopy 39. Pins 909 extending through locking cones 910 of the same construction shown in FIG. 5 releasably retain flaps 908 in place to keep the bottom end of sleeve 900 closed except for an opening through which suspension lines 38 extend.

Rocket 90 is launched from tube 110 in the manner previously described and passes out through the top of bag 902 to pull launching tube 110 behind it. The tension applied through tow line 904 pulls sleeve 900 out of the top of bag 902 to pay out suspension lines 38. In this embodiment, suspension lines 38 are payed out through the top of the parachute pack, rather than the bottom of the pack as described in the previous embodiments.

At suspension line stretch, lanyards 912 secured to suspension lines 38 and to pins 909 out of locking cones 910 to open the bottom of sleeve 900. As a result, further ignited flight of rocket 90 strips sleeve 900 off of canopy 39, allowing the parachute to open.

In the event that rocket 90 fails to be launched from launching tube 110, the upper bridle line of stabilizing parachute 24 remains connected to rocket 90 to pull the rocket, launching tube 110, and sleeve 900 containing canopy 39 from bag 902 in the manner shown in FIGS. 40E and 40F.

As shown in FIG. 42, a further redundancy may be obtained by connecting the canopy of a further pilot parachute 920 to launching tube 110 with a tow line 922 and by connecting the suspension lines of parachute 920 to sleeve 900 by a tow line 924.

As shown in FIG. 43, the rocket extracted parachute assembly of this invention may be employed in the recovery of an encapsulated seat 926 after it is separated and ejected from the aircraft. The parachute assembly of this invention may be stored in a compartment 928 at the bottom of seat 926, and suspension lines 38 of parachute 26 are connected to the housing of seat 926 by riser lines indicated at 930.

In the claims and description, the term "load" is intended to cover persons, cargoes or any other objects.

The invention may be embodied in other specific forms without departing from the spirit or essential characteristics thereof. The present invention are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a parachute assembly, a parachute having a canopy, a canopy spreading apparatus comprising a plurality of projectiles, means securing said projectiles to said canopy, a spreader head, retainer means releasably retaining said projectiles in unprojected positions on said spreader head, gas generator means for supplying gas under pressure to the interior of said to effect the powered projection of said projectiles away from said head, said projectiles being effective upon being projected away from said head by said gas to spread said canopy, and means responsive to a pre-selected parachute suspension line stretch to release said retainer means in the event said projectiles are not projected away from said head, said projectiles being freed for displacement away from said head when said retainer means is released, and said canopy being freed from said head for aerodynamic opening upon freeing said projectiles from said head.

2. The apparatus defined in claim 1 comprising spring means biasing said projectiles in a direction to assist in the aerodynamic opening of said canopy.

3. An apparatus for spreading a parachute canopy comprising a spreader head, a plurality of projectiles positioned on said spreader head, means securing said projectiles to said canopy, and means for effecting the powered projection of said projectiles away from said head to spread from said canopy and comprising pressure chamber means in said spreader head, means for supplying gas under pressure to said pressure chamber means, and a piston and cylinder assembly for each of said projectiles, said assembly comprising a cylinder supporting its associated projectile and being open at both ends, said cylinder being mounted in said spreader head in fluid communication with said pressure chamber means, a piston slidable in said cylinder, and a rod extending through the outer end of said cylinder for transmitting the motion of said piston to project the associated projectile, said rod being formed with a tapered section wedgingly engageable in a tapered bore that is formed in the associated projectile.

4. In a fail-safe parachute apparatus, the combination of a parachute canopy; means for connecting said canopy operatively to a load for suspension of the load from the canopy when the canopy has been spread; a power operated canopy spreading device comprising power means; a plurality of projectiles connected to said canopy and occupying an initial position on said spreading device and arranged to be projected radially outwardly therefrom, to positively spread said canopy, as a result of actuation of said power means; actuating means operatively arranged to actuate said power means in response to an actuating input; and releasable restraining means operatively arranged to retain said projectiles in said initial position prior to actuation of said power means; and control means connected to said actuating means and to said restraining means and operative to release said restraining means, thereby freeing said projectiles, whenever an actuating input is supplied to said actuating means.

5. In a spreading device, the combination of a plurality of spreading projectiles; housing means having laterally directed, exteriorly disposed means for positioning said projectiles, said projectiles being engaged with said positioning means and arranged in an annular series, surrounding said housing means; power means carried in said housing and operative to project said projectiles generally radially from said housing means when said power means is actuated; restraining means mounted on said housing means for movement between a first position, in which said restraining means engages said projectiles to retain the same on said housing means, and a second position, in which said restraining means is disengaged from said projectiles, said projectiles being freed for substantially unimpeded removal from said housing means when said restraining means is moved to said second position; and control means for actuating said power means and moving said restraining means toward said second position.

6. In a parachute canopy spreading device, the combination of a plurality of canopy spreading projectiles; a housing having laterally directed means for positioning said projectiles, said projectiles being engaged with said positioning means; power means carried by said housing and operative to project said projectiles laterally from said housing when said power means is actuated; restraining means releasibly engaged with said projectiles to retain the same in engagement with said positioning means, said restraining means being mounted for movement in a direction such as to disengage the same from said projectiles, said projectiles being free for lateral removal from said positioning means when said restraining means is disengaged; and control means operatively connected to actuate said power means and to move said restraining means in said direction.

7. A method of fail-safe opening a parachute canopy in an apparatus which includes a ballistic spreader for ballistically spreading said canopy in response to the occurrence of a pre-selected event, said method comprising the step of non-explosively, mechanically freeing said canopy for aerodynamic opening in the event of failure of said spreader to respond to the occurrence of said pre-selected event.

8. A method of fail-safe opening a normally ballistically operated parachute canopy in an apparatus which restrains the canopy against opening prior to the occurrence of a pre-selected event and which includes a ballistic spreader for ballistically spreading said canopy in response to the occurrence of said pre-selected event, said method comprising the step of non-explosively, mechanically freeing said canopy for aerodynamic opening in the event of failure of said spreader to spread said canopy upon the occurrence of said pre-selected event.

9. A method of fail-safe opening a normally ballistically operated parachute canopy in an apparatus which includes an actuatable operator and a ballistic canopy spreader for ballistically spreading said canopy in response to actuation of said operator, said method comprising the step of independently non-explosively, mechanically freeing said canopy for aerodynamic opening in the event of failure of said spreader to respond to the actuation of said operator.

10. A method of fail-safe opening a parachute canopy in an apparatus which includes an actuatable operator and a ballistic spreader for ballistically spreading said canopy in response to actuation of said operator and which secures the skirt of said canopy to a part of said spreader to prevent said canopy for opening prior to actuation of said operator, said method comprising the steps of non-explosively, mechanically freeing said canopy from said part for aerodynamic opening in the event of failure of said spreader to respond to actuation of said operator, and aerodynamically opening the thusly freed canopy.

11. A method of opening a parachute canopy comprising the steps of releasably restraining said canopy against spreading and opening prior to the occurrence of a pre-selected event, ballistically spreading said canopy upon the occurrence of said pre-selected event non-explosively, mechanically freeing said canopy for aerodynamic opening in the event that said canopy remains restrained following the occurrence of said pre-selected event, and finally aerodynamically opening the thusly freed canopy.

12. A method of opening a canopy of a parachute which has suspensions lines for connecting said canopy to a load, said method comprising the steps of restraining said canopy against spreading and opening prior to a pre-selected extension of said suspension lines, ballistically spreading said canopy upon the occurrence of the pre-selected extension of said suspension lines, and non-explosively, mechanically freeing said canopy for aerodynamic opening in the event that said canopy remains restrained following the pre-selected extension of said suspension lines.

13. In a fail-safe parachute apparatus having a parachute and means for ballistically spreading the canopy of said parachute, the improvement comprising non-explosive, mechanical fail-safe means that frees said canopy for aerodynamic opening in the event of failure of said canopy spreading means.

14. In a fail-safe parachute apparatus having a parachute and means responsive to a pre-selected contingency to ballistically spread the canopy of said parachute, the improvement comprising non-explosive, mechanical fail-safe means which is effective following the occurrence of said pre-selected contigency to free said canopy for aerodynamic opening in the event of failure of said canopy spreading means.

15. In a fail-safe parachute apparatus, a parachute having a canopy, means for restraining spreading and opening of said canopy prior to the occurrence of a pre-selected event, means responsive to the occurrence of said pre-selected event for ballistically spreading said canopy, and non-explosive, mechanical fail-safe means for freeing said canopy for aerodynamic opening in the event that said canopy is still restrained by said restraining means following the occurrence of said pre-selected event.

16. In a fail-safe parachute apparatus having a parachute and a power system which is operable to ballistically spread the canopy of said parachute, the improvement comprising a non-explosive, mechanical fail-safe system which is operable in the event of failure of said power system to free said canopy for aerodynamic opening without ballistically spreading the canopy.

17. In a fail-safe parachute apparatus, a parachute having a canopy, a plurality of projectiles secured to the skirt of said canopy, a spreader head, a releasable restraining device retaining said projectiles in un-projected positions on said spreader head, said restraining device being effective upon being released to free said projectiles for displacement away from said spreader head, and said projectiles being effective upon being freed for displacement from said spreader head to free said canopy for aerodynamic opening, means responsive to the occurrence of a pre-selected event to generate gas for effecting the powered projection of said projectiles away from said spreader head to spread said canopy, and non-explosive means for releasing said restraining device to thereby free said canopy for aerodynamic opening in the event that said projectiles remain in said unprojected positions following the occurrence of said pre-selected event.

18. In a fail-safe parachute canopy spreading apparatus a spreader head, a plurality of projectiles adpated to be connected to the skirt of a parachute canopy, a device releasably retaining said projectiles in unprojected positions on said spreader head, a gas generator which when initiated supplies gas under pressure to effect the powered projection of said projectiles away from said spreader head for spreading said canopy, and control means for effecting the initiation of said gas generator and further for releasing said device to free said projectiles for displacement away from said spreader head in the event that said gas generator fails to project said projectiles away from said head.

19. In a parachute apparatus, a parachute having a canopy, a spreader head, a plurality of projectiles positioned on said head and secured to said canopy, and means for effecting the powered projection of said projectiles away from said head to spread said canopy, said head being formed with a central portion and only one pair of flange portions extending in diametrically opposite directions from diametrically opposite regions on said central portion to provide said head with a non-circular configuration in a plane containing the projection paths of said projectiles, all of the projectiles for spreading said canopy being positioned only on said flange portions.

* * * * *

UNITED STATES PATENT AND TRADEMARK OFFICE
CERTIFICATE OF CORRECTION

PATENT NO. : 3,926,391  
DATED : December 16, 1975  
INVENTOR(S) : Louis R. Nordine Page 1 of 2

It is certified that error appears in the above-identified patent and that said Letters Patent are hereby corrected as shown below:

IN THE SPECIFICATION:

Column 1, line 25: Change "ingited" to --ignited--.

Column 4, line 18: Change "puposely" to --purposely--.

Column 4, line 26: Change "noval" to --novel--.

Column 18, line 13: Change "two" to --tow--.

Column 20, line 26: Change "bores" to --bored--.

Column 22, line 39: Change "701" to --702--.

Column 22, line 40: Change "move_ment" to --movement--.

Column 24, line 12: Change "safety" to --Safety--.

Column 26, line 20: After the number "832" delete the word "is".

Column 27, line 2: Change "cylinder" to --Cylinder--.

Column 27, line 31: Change "947" to --847--.

Column 27, line 56: Delete the word "a" after "39,".

Column 28, line 33: Change "ingiting" to --igniting--.

UNITED STATES PATENT AND TRADEMARK OFFICE
CERTIFICATE OF CORRECTION

PATENT NO. : 3,926,391

DATED : December 16, 1975

INVENTOR(S) : Louis R. Nordine

It is certified that error appears in the above-identified patent and that said Letters Patent are hereby corrected as shown below:

Column 29, line 21: Change "envent" to --event--.

Column 30, line 23: After "909" insert --pull pins 909--

Column 30, line 50: Change "invention" to --embodiments--.

IN THE CLAIMS:

Claim 1, column 30, line 65: After "said" insert --head--.

Claim 3, column 30, line 17: Delete the word "from".

Claim 18, column 34, line 18: Insert a comma after "apparatus".

Signed and Sealed this twenty-second Day of June 1976

[SEAL]

Attest:

RUTH C. MASON
Attesting Officer

C. MARSHALL DANN
Commissioner of Patents and Trademarks